United States Patent
Yang et al.

(10) Patent No.: US 10,980,034 B2
(45) Date of Patent: Apr. 13, 2021

(54) METHOD FOR TERMINAL TRANSMITTING CHANNEL STATE INFORMATION IN WIRELESS COMMUNICATION SYSTEM, AND TERMINAL THAT USES THE METHOD

(71) Applicant: LG Electronics Inc., Seoul (KR)

(72) Inventors: Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/875,298

(22) Filed: May 15, 2020

(65) Prior Publication Data

US 2020/0280996 A1 Sep. 3, 2020

Related U.S. Application Data

(63) Continuation of application No. PCT/KR2018/013997, filed on Nov. 15, 2018.
(Continued)

(30) Foreign Application Priority Data

Nov. 14, 2018 (KR) .................. 10-2018-0140055

(51) Int. Cl.
 *H04W 4/00* (2018.01)
 *H04W 72/08* (2009.01)
(Continued)

(52) U.S. Cl.
 CPC .......... *H04W 72/08* (2013.01); *H04B 7/0626* (2013.01); *H04L 1/1664* (2013.01);
(Continued)

(58) Field of Classification Search
None
See application file for complete search history.

(56) References Cited

U.S. PATENT DOCUMENTS 9,509,389 B2 * 11/2016 Seo ................ H04L 1/0027
2016/0094996 A1 * 3/2016 Xiong ............. H04W 16/14
 370/329
2019/0268089 A1 * 8/2019 Fu ................. H04W 72/042

FOREIGN PATENT DOCUMENTS

KR 20150110642 10/2015
KR 20170037994 4/2017

OTHER PUBLICATIONS

Ericsson, "Offline session notes CSI reporting (AI 7.2.2.2)," R1-1719142, 3GPP TSG RAN WG1 Meeting 90bis, Prague, CZ, Oct. 9-13, 2017, 6 pages.
(Continued)

*Primary Examiner* — Phuongchau Ba Nguyen
(74) *Attorney, Agent, or Firm* — Fish & Richardson P.C.

(57) ABSTRACT

The present disclosure provides a method for transmitting a first physical uplink shared channel (PUSCH) or a second PUSCH performed by a UE in a wireless communication system, the method comprising receiving control signal; and transmitting the first PUSCH or the second PUSCH after receiving the control information, wherein the first PUSCH includes a report on semi-persistent channel state information (CSI), the second PUSCH includes uplink data; and when transmission of the first PUSCH overlaps transmission of the second PUSCH in time, the UE does not transmit the first PUSCH but transmits the second PUSCH.

8 Claims, 20 Drawing Sheets

Related U.S. Application Data

(60) Provisional application No. 62/586,870, filed on Nov. 15, 2017.

(51) Int. Cl.
*H04B 7/06* (2006.01)
*H04L 1/16* (2006.01)
*H04W 72/04* (2009.01)

(52) U.S. Cl.
CPC ..... *H04W 72/042* (2013.01); *H04W 72/0413* (2013.01); *H04W 72/0493* (2013.01)

(56) References Cited

OTHER PUBLICATIONS

Ericsson, "On semi-persistent CSI reporting on PUSCH," R1-1718442, 3GPP TSG-RAN WG1 #90bis, Prague, Czech Republic, Oct. 9-13, 2017, 4 pages.
LG Electronics, "Discussions on CSI reporting," R1-1717940, 3GPP TSG RAN WG1 Meeting #90bis, Prague, Czech Republic, Oct. 9-13, 2017, 8 pages.
Qualcomm Incorporated, "On Type I and Type II CSI Reporting," R1-1716395, 3GPP TSG RAN WG1 NR Ad-Hoc #3, Nagoya, Japan, Sep. 18-21, 2017, 5 pages.
Korean Office Action in Korean Appln. No. 10-2019-0150274, dated Feb. 4, 2020, 8 pages (with English translation).
3rd Generation Partnership Project; Technical Specification Group Radio Access Network; "NR; Physical layer procedures for data (Release 15)," 3GPP TS 38.214, dated Oct. 2017, 51 pages.
Extended European Search Report in European Patent Appln. No. 18878737.8, dated Oct. 29, 2020, 9 pages.
Huawei, HiSilicon, "Details of CSI reporting on PUCCH/PUSCH," R1-1715466, 3GPP TSG RAN WG1 Meeting NR#3, Nagoya, Japan, Sep. 18-21, 2017, 9 pages.
Intel Corporation, "Support of NC-JT in NR," R1-1712542, 3GPP TSG RAN WG1 Meeting #90, Prague, P.R. Czech, Aug. 21-25, 2017, 4 pages.

* cited by examiner

METHOD FOR TERMINAL TRANSMITTING CHANNEL STATE INFORMATION IN WIRELESS COMMUNICATION SYSTEM, AND TERMINAL THAT USES THE METHOD

CROSS-REFERENCE TO RELATED APPLICATION

Pursuant to 35 U.S.C. § 119 (e), this application is a continuation of International Application No. PCT/KR2018/013997, filed on Nov. 15, 2018, which claims the benefit of U.S. Provisional Application No. 62/586,870 filed on Nov. 15, 2017 and Korean Patent Application No. 10-2018-0140055 filed on Nov. 14, 2018, the contents of which are all hereby incorporated by reference herein in their entirety.

BACKGROUND OF THE DISCLOSURE

Field of the Disclosure

The present disclosure relates to wireless communication and, more particularly, to a method for transmitting channel state information of a terminal in a wireless communication system and a terminal using the method.

Related Art

Recently, the 3rd generation partnership project (3GPP) standards development organizations (SDOs) are considering to use a network slicing scheme to implement a plurality of logical networks on a single physical network for the New RAT (NR) system, which is the 5G wireless communication system. To implement the logical network, a scheme employing Orthogonal Frequency Division Multiplexing (OFDM) is being considered, which is capable of supporting services imposing various operating conditions (for example, eMBB, mMTC, and URLLC) and providing variable numerologies according to the various services in the physical layer of the NR system. In other words, the NR system may consider to adopt an OFDM scheme (or a multiple access scheme) providing an independent numerology for each time and frequency resource region.

In what follows, the present disclosure proposes a terminal operation at the time of collision between a PUSCH transmitting semi-persistent CSI (SP-CSI) and another UL physical channel (for example, a PUCCH or a PUSCH) when the semi-persistent transmission of CSI utilizing a PUSCH or PUCCH resource (namely an operation for transmitting CSI at a predetermined period during a predetermined time period) is supported in a wireless communication system comprising a base station and a terminal. Also, the present disclosure proposes a method for allocating a PUCCH resource for SP-CSI transmission when SP-CSI is transmitted to the PUCCH resource.

SUMMARY OF THE DISCLOSURE

The present disclosure provides a method for transmitting channel state information of a terminal in a wireless communication system and a terminal using the method.

In an aspect, a method for transmitting a first physical uplink shared channel (PUSCH) or a second PUSCH in a wireless communication is provided. The method may be performed by a user equipment (UE) and may be comprise receiving control information and transmitting the first PUSCH or the second PUSCH after receiving the control information, wherein the first PUSCH includes a report for semi-persistent channel state information (CSI), wherein the second PUSCH includes a uplink data, and wherein, if a transmission of the first PUSCH overlaps in time with a transmission of the second PUSCH, the UE does not transmit the first PUSCH and transmits the second PUSCH.

The control information may be downlink control information (DCI).

The control information may be transmitted from a base station.

The first PUSCH or the second PUSCH may be transmitted to a base station.

The semi-persistent CSI may be transmitted at a predetermined period during a predetermined time period.

The uplink data may be a uplink shared channel (UL-SCH).

In another aspect, a User Equipment (UE) is provided. The UE may comprise a transceiver transmitting and receiving a radio signal and a processor operating in conjunction with the transceiver, wherein the processor is configured to: receiving control information and transmitting the first PUSCH or the second PUSCH after receiving the control information, wherein the first PUSCH includes a report for semi-persistent channel state information (CSI), wherein the second PUSCH includes a uplink data, and wherein, if a transmission of the first PUSCH overlaps in time with a transmission of the second PUSCH, the UE does not transmit the first PUSCH and transmits the second PUSCH.

According to the present disclosure, when a terminal is allowed to transmit only one uplink channel at the same time instant, the terminal may clearly prioritize channels for transmission. More specifically, if a terminal transmits a PUSCH for uplink data first, which is relatively more important than a PUSCH related to SP-CSI, a base station may receive relatively important information in a reliable manner, by which stability of wireless communication may be improved.

DESCRIPTION OF EXEMPLARY EMBODIMENTS

In what follows, for those terms or acronyms not defined separately, the 3GPP TS 36 series or TS 38 series may be referred to.

Figure 1:
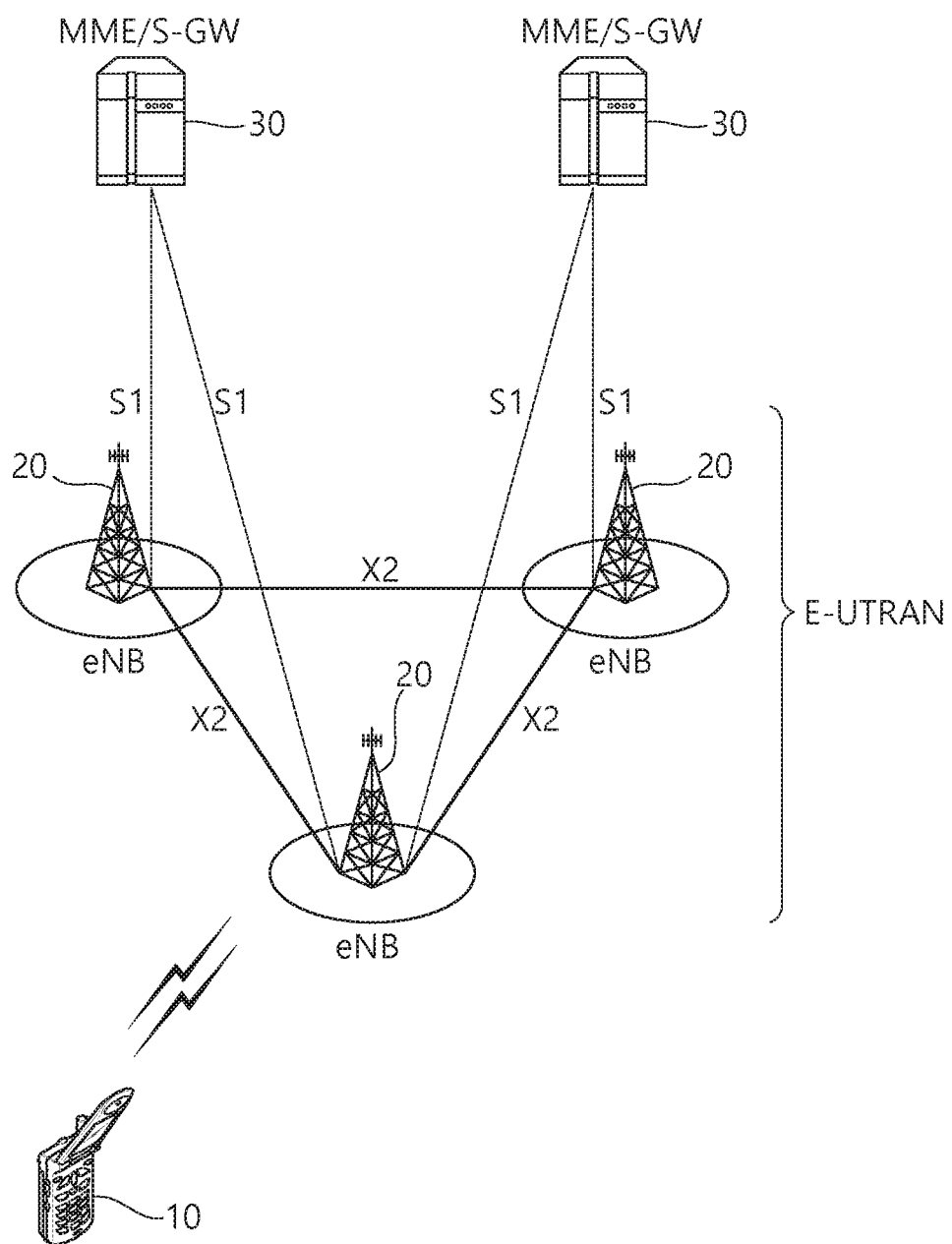
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
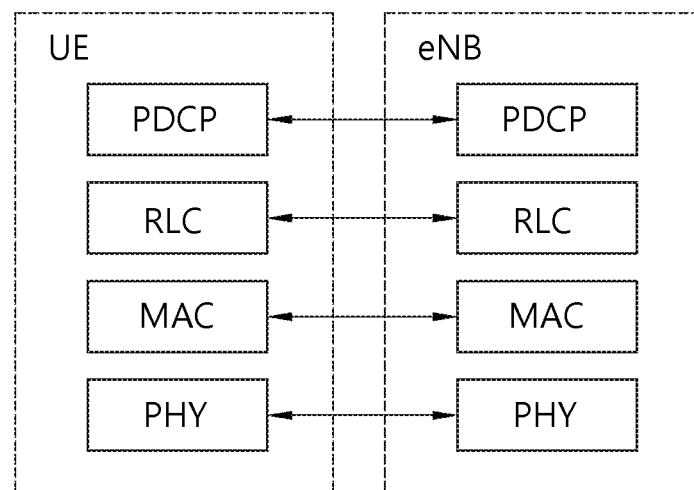
FIG. 2 is a diagram showing a wireless protocol architecture for a user plane. \
Figure 3:
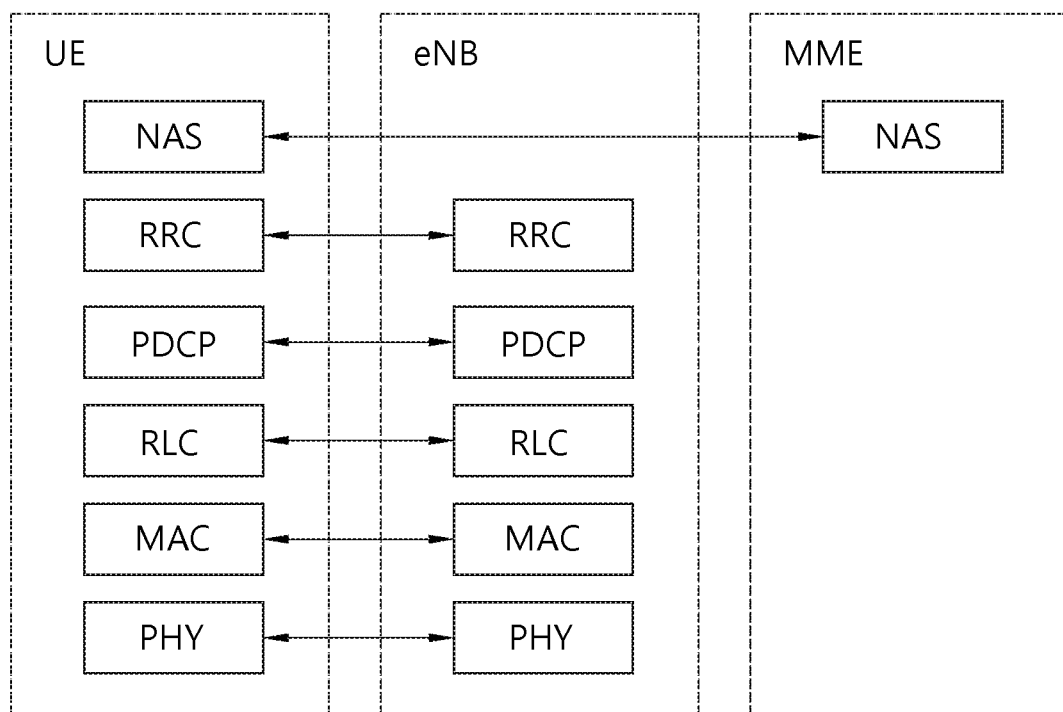
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
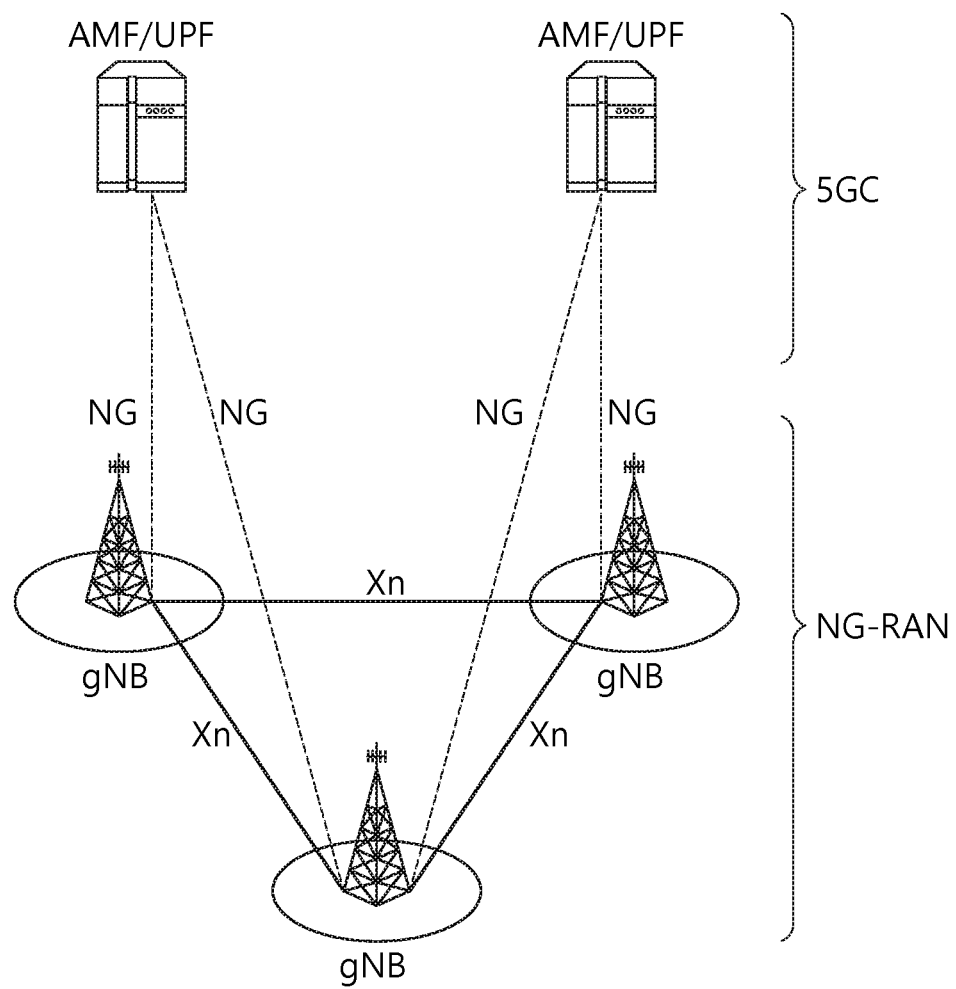
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
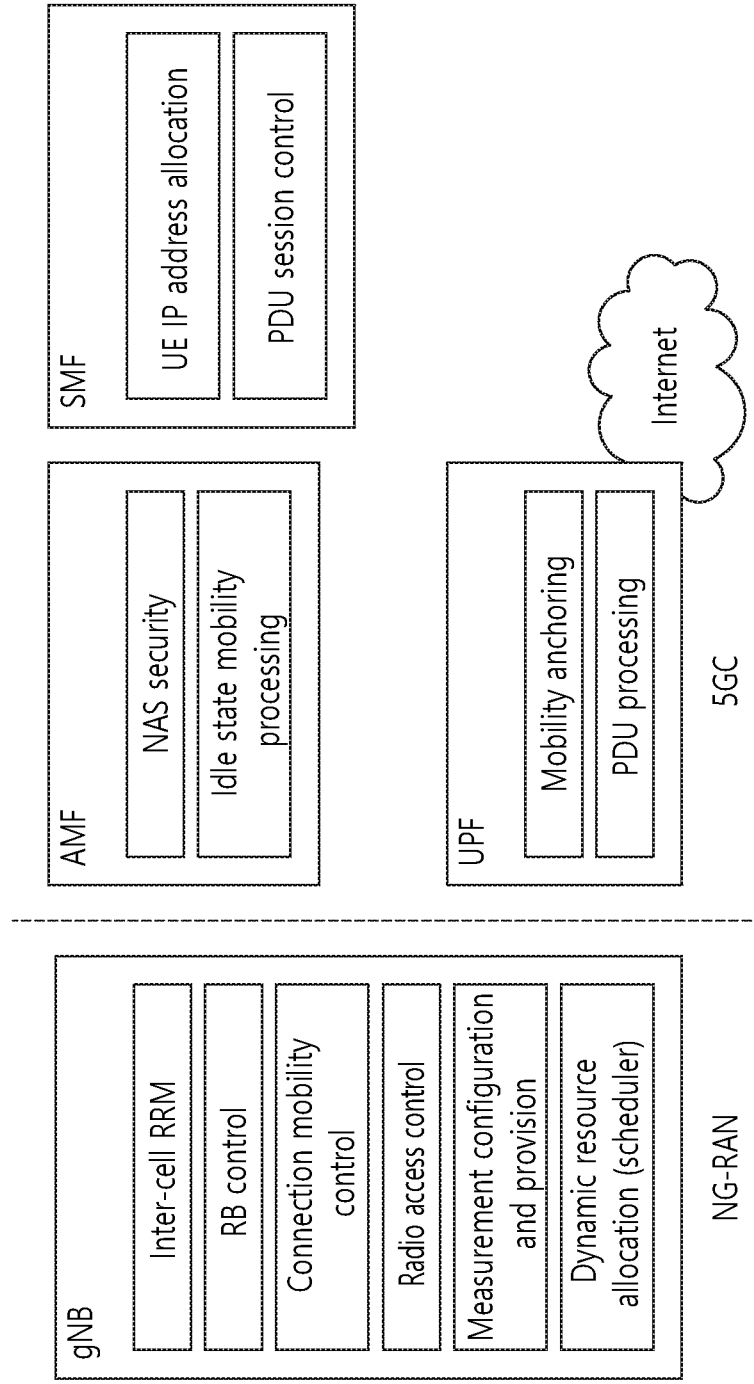
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<3GPP LTE and New RAT (NR)>

In what follows, descriptions about the LTE and the NR will be given. Regarding the TS 36 series of the 3GPP specification, as a larger number of communication devices require greater communication capacity, a need for mobile broadband communication more enhanced than the legacy radio access technology is emerging. Also, massive Machine Type Communication (MTC) that connects a plurality of devices and objects to each other and provides various services anytime and anywhere is one of primary issues to be considered in the next-generation communication. Moreover, a communication system design that considers a service/UE sensitive to reliability and latency is under discussion.

As described above, adoption of the next-generation radio access technology (RAT) that takes account of enhanced mobile broadband communication (eMBB), massive MTC (mMTC), and Ultra Reliable and Low Latency Communication (URLLC) is being discussed, and in the present disclosure, for the purpose of convenience, the corresponding technology is called New RAT (NR).

<Self-Contained Subframe Structure>

To minimize latency in the fifth generation NR, a structure in which a control channel and a data channel are TDMed as shown in the figure below may be considered as one of frame structures.

Figure 6:
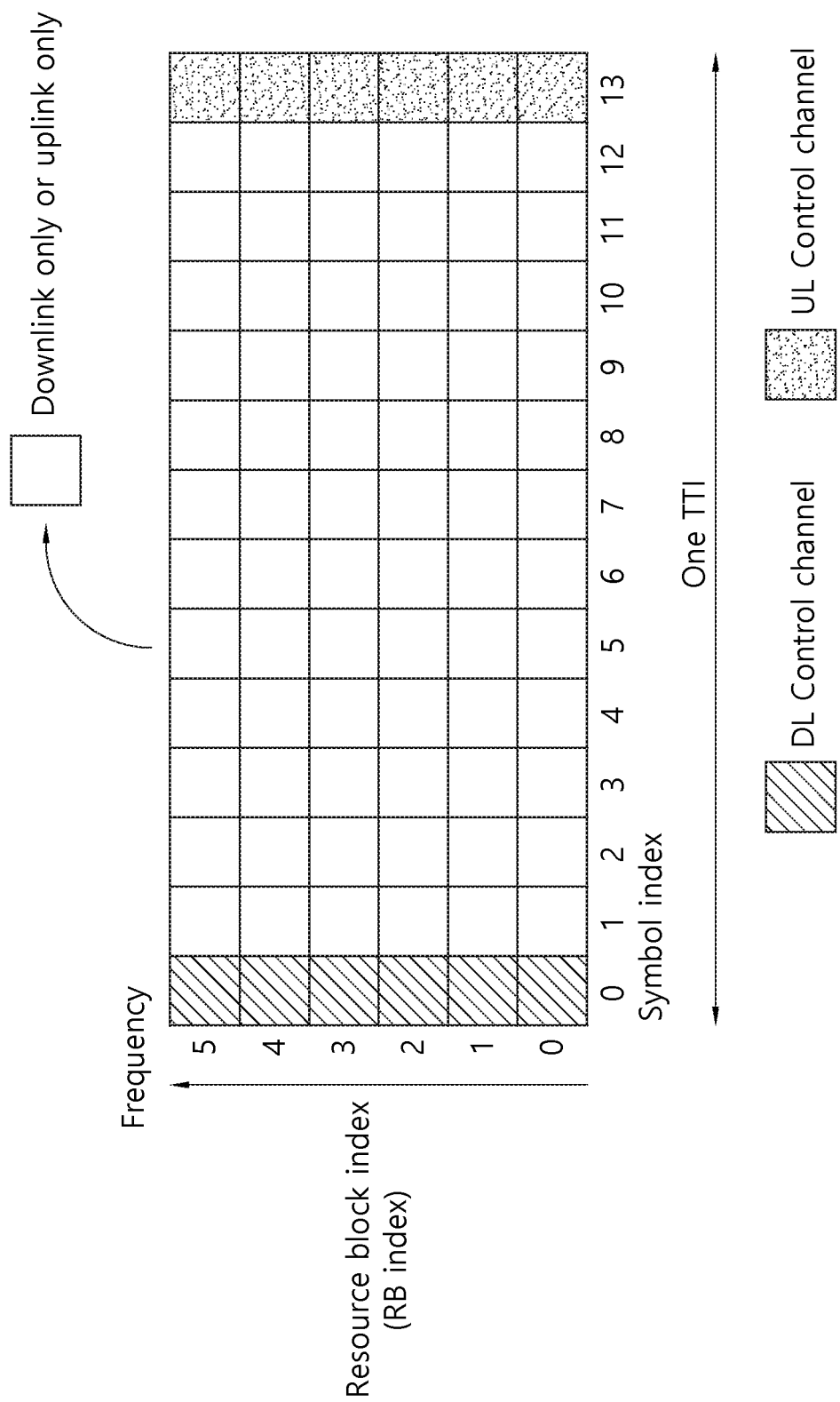
FIG. 6 illustrates one example of a frame structure based on the Time Division Multiplexing (TDM) of a data channel and a control channel.

FIG. 6 illustrates one example of a frame structure based on the Time Division Multiplexing (TDM) of a data channel and a control channel.

According to FIG. 6, as one example of frame structures, one subframe (here, a subframe may be called interchangeably a transmission time interval (TTI)) may be expressed based on an index of a resource block (RB) and an index of a symbol. At this time, one TTI may include a region related to a downlink control channel, a region related to an uplink control channel, and a downlink or uplink region.

For example, to describe the TTI structure with reference to FIG. 6, the hatched region represents a downlink control region, and the region in black color represents an uplink control region. The region without any mark may be used for transmission of downlink data or transmission of uplink data. A characteristic feature of this structure is that downlink (DL) transmission and uplink (UL) transmission are performed sequentially within one subframe, and DL data may be transmitted and UL Acknowledged/Not-Acknowledged (ack/nack) may be received within one subframe. Consequently, when an error occurs during data transmission, a time required for retransmitting data may be reduced, and thus, latency to finally transmit data may be minimized.

A time gap for a process of switching from a transmission mode to a reception mode or from the reception mode to the transmission mode by a base station and a UE in the data and control TDMed subframe structure is required. To this purpose, in the subframe structure, some of the OFDM symbols at the time of switching from DL to UL transmission are configured as a guard period (GP).

<Analog Beamforming>

Since wavelength in the millimeter wave (mmW) band is very short, it becomes possible to install multiple antennas on the same area. In other words, in the 30 GHz band, the corresponding wavelength is about 1 cm, and a total of 100 antenna elements may be installed in a two dimensional array form on a panel of 5 cm×5 cm size with spacing of 0.5 lambda. Therefore, in the mmW band, multiple antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource. However, installing TXRUs in all of 100 or more antenna elements raises an effectiveness issue in terms of cost. Therefore, a method for mapping multiple antenna elements to one TXRU and adjusting a beam direction by using an analog phase shifter is being considered. However, this kind of analog beamforming (BF) method has a disadvantage that frequency selective BF is not possible because only one beam direction may be implemented over the whole band.

As an intermediate solution between digital BF and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission may be limited below B.

<Analog Beamforming—2>

In the NR system, a hybrid beamforming scheme is emerging, which combines digital beamforming and analog beamforming when a plurality of antennas are used. At this time, analog beamforming (or RF beamforming) refers to an operation of performing precoding (or combining) in the RF block.

In the hybrid beamforming scheme, the baseband block and the RF block perform precoding (or combining) respectively, according to which an advantage is obtained that performance comparable to that of digital beamforming is achieved while the number of RF chains and the number of D/A (or A/D) converters are reduced.

For the sake of convenience, the hybrid beamforming structure is assumed to be composed of N transceiver units (TXRUs) and M physical antennas. Then, digital beamforming for L data layers to be transmitted from the transmitter block may be expressed by an N-by-L matrix. N transformed digital signals are subsequently converted to analog signals through the TXRUs, after which analog beamforming expressed by an M-by-N matrix is applied.

For the convenience of understanding, the hybrid beamforming structure from perspectives of an TXRU and a physical antenna may be illustrated as follows.

Figure 7:
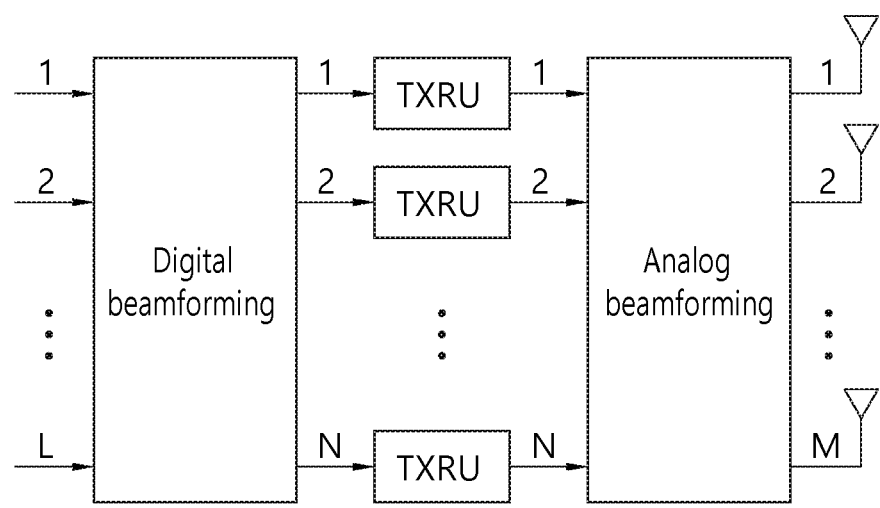
FIG. 7 illustrates a hybrid beamforming structure from perspectives of a TXRU and a physical antenna.

FIG. 7 illustrates a hybrid beamforming structure from perspectives of a TXRU and a physical antenna.

According to the example of FIG. 7, the number of digital beams is L, and the number of analog beams is N. Furthermore, the NR system is designed so that a base station may change analog beamforming in symbol units to support more efficient beamforming for a UE located in a particular region.

In addition, the example of FIG. 7 assumes to use a scheme in which the NR system adopts a plurality of antenna panels capable of independent hybrid beamforming when specific N TXRUs and M RF antennas are defined as one antenna panel.

As described above, suppose the base station uses a plurality of analog beams. Since an analog beam suitable for signal reception may differ for each UE, a beam sweeping operation is considered, which converts a plurality of analog beams to be applied by the base station in a specific subframe (SF) on the symbol basis at least for a synchronization signal, system information, and a paging signal so that every UE may have an opportunity of reception.

In what follows, the beam sweeping operation with respect to a synchronization signal and system information during a downlink transmission process will be described in more detail with reference to a related drawing.

Figure 8:
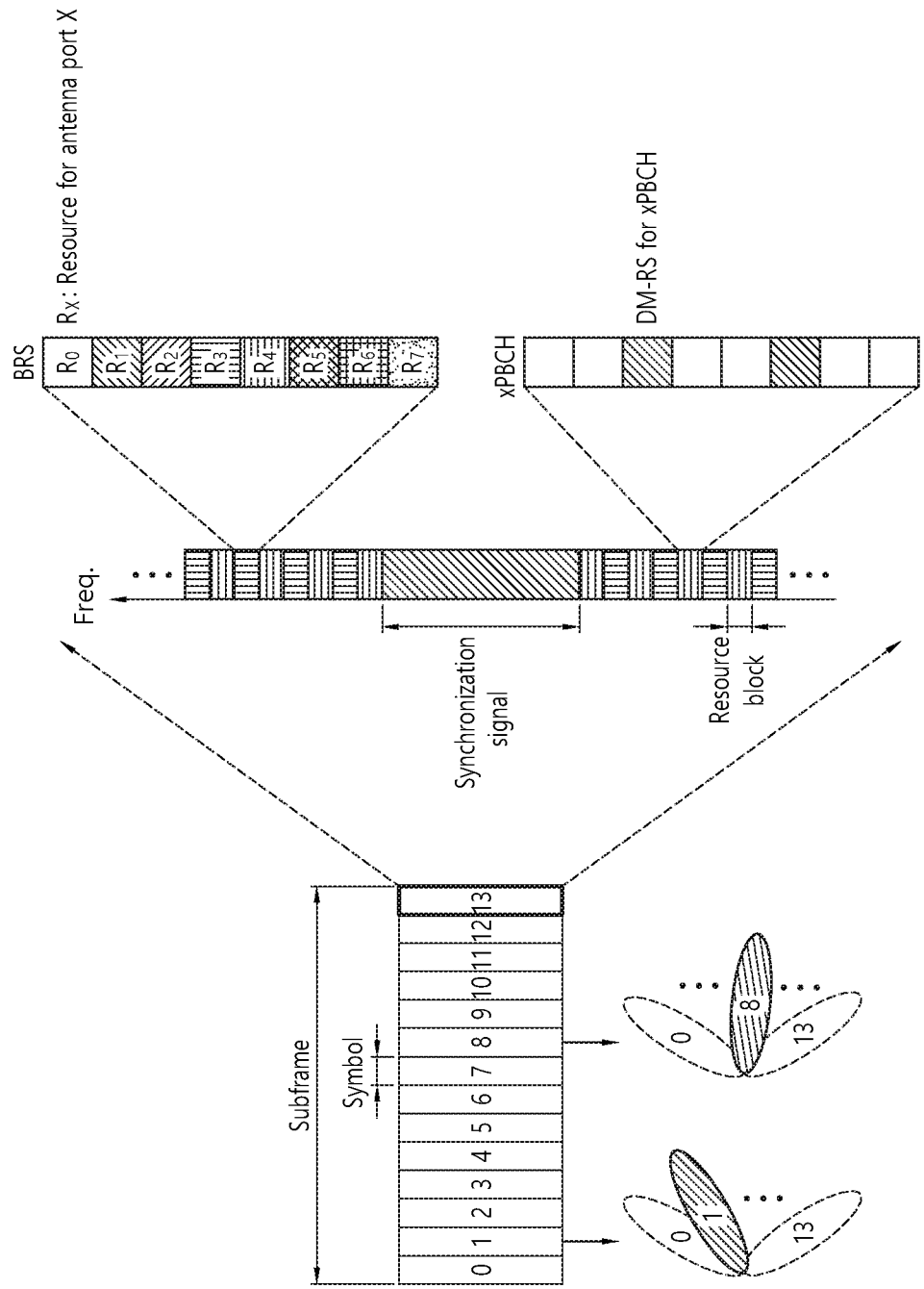
FIG. 8 illustrates one example of a beam sweeping operation with respect to a synchronization signal and system information during a downlink transmission process.

FIG. 8 illustrates one example of a beam sweeping operation with respect to a synchronization signal and system information during a downlink transmission process.

According to FIG. 8, a physical resource (or a physical channel) to which system information of the NR system is transmitted in a broadcasting scheme may be called a physical broadcast channel (xPBCH).

Analog beams belonging to different antenna panels within one symbol may be transmitted simultaneously, and a Beam RS (BRS) may be adopted, which is a reference signal (RS) transmitted by applying a single analog beam (corresponding to a specific antenna panel) thereto to measure a channel for each analog beam.

The BRS may be defined for a plurality of antenna ports, and each antenna port of the BRS may correspond to a single analog beam. At this time, different from the BRS, the synchronization signal or the xPBCH may be transmitted by applying all the analog beams within an analog beam group thereto so as to be well received by an arbitrary UE.

<Radio Resource Management (RRM) Measurement>

The LTE system supports an RRM operation including power control, scheduling, cell search, cell reselection, handover, radio link or connection monitoring, and connection establishment/re-establishment.

At this time, a serving cell may request RRM measurement information from a UE, which is a measurement value for performing the RRM operation. As a typical example, in the LTE system, a UE may measure and report information such as cell search information, reference signal received power (RSRP), and reference signal received quality (RSRQ).

Specifically, in the LTE system, a UE receives 'measConfig' as a higher layer signal for RRM measurement from the serving cell. The UE measures RSRP or RSRQ according to the information of the 'measConfig'. Here, definitions of the RSRP and the RSRQ according to the LTE system may be given as follows.

—RSRP:

Reference Signal Received Power (RSRP) is defined as the linear average over the power contributions of resource elements that carry cell-specific reference signals within the considered measurement frequency bandwidth. For RSRP determination, the cell-specific reference signal R0 according to the TS 36 series may be used. If the UE reliably detects that R1 is available, the UE may use R1 in addition to R0 to determine RSRP.

The reference point for the RSRP may be the antenna connector of the UE.

If receiver diversity is in use by the UE, the reported value may not be lower than the corresponding RSRP of any of the individual diversity branches.

—RSRQ:

Reference Signal Received Quality (RSRQ) is defined as the ratio N×RSRP/(E-UTRA carrier RSSI). Here, N is the number of resource blocks (RBs) of the E-UTRA carrier RSSI measurement bandwidth. The measurements in the numerator and the denominator may be made over the same set of resource blocks.

E-UTRA carrier received signal strength indicator (RSSI) comprises the linear average of the total received power (in [W]) observed in OFDM symbols containing reference symbols for antenna port 0, in the measurement bandwidth over N number of resource blocks by the UE from all the sources, including co-channel serving and non-serving cells, adjacent channel interference, and thermal noise.

If higher layer signaling indicates certain subframes for performing RSRQ measurement, then RSSI is measured over all OFDM symbols in the indicated subframes.

The reference point for the RSRQ may be the antenna connector of the UE. If receiver diversity is in use by the UE, the reported value may not be lower than the corresponding RSRQ of any of the individual diversity branches.

—RSSI:

RSSI may be defined as received wideband power, including thermal noise and noise generated in the receiver within the bandwidth defined by a receiver pulse shaping filter.

The reference point for measurement may be the antenna connector of the UE. If receiver diversity is in use by the UE, the reported value may not be lower than the corresponding UTRA carrier RSSI of any of the individual receive antenna branches.

According to the definitions, a UE operating in the LTE system may be allowed to measure RSRP in the bandwidth corresponding to one of 6, 15, 25, 50, 75, 100 resource block (RB) through an information element (IE) related to allowed measurement bandwidth transmitted from the system information block type 3 (SIB3) in the case of intra-frequency measurement, through allowed measurement bandwidth transmitted from the SIB5 in the case of inter-frequency measurement, or allowed to measure RSRP in the frequency band of the whole downlink (DL) system by default in the absence of the IE.

At this time, if the UE receives allowed measurement bandwidth, the UE may consider the corresponding value as the maximum measurement bandwidth and may measure the value of RSRP freely within the corresponding value.

However, if the serving cell transmits an IE defined by the WB-RSRQ, and the allowed measurement bandwidth is set to be larger than 50 RBs, the UE has to calculate the RSRP value over the total allowed measurement bandwidth. Meanwhile, for RSSI determination, RSSI is measured over the frequency band allowed for the UE's receiver according to the definition of the RSSI bandwidth.

In What Follows, the Present Disclosure is Described.

Recently, the 3rd generation partnership project (3GPP) standards development organizations (SDOs) are considering to use a network slicing scheme to implement a plurality of logical networks on a single physical network for the New RAT (NR) system, which is the 5G wireless communication system.

To implement the logical network, a scheme employing Orthogonal Frequency Division Multiplexing (OFDM) is being considered, which is capable of supporting services imposing various operating conditions (for example, eMBB, mMTC, and URLLC) and providing variable numerologies according to the various services in the physical layer of the NR system. In other words, the NR system may consider to adopt an OFDM scheme (or a multiple access scheme) providing an independent numerology for each time and frequency resources.

In the NR system, a slot consisting of a plurality of OFDM symbols is defined as a basic time unit for data scheduling, and a scheme for reducing latency for transmission of HARQ-ACK (or a decoding result) within the slot is being considered, where a Physical Uplink Control Channel (PUCCH), a physical channel for transmission of a UL control signal, is transmitted within a short time period by being TDMed with a data channel as shown in FIG. 6.

In what follows, for the convenience of description, in the present disclosure, a PUCCH transmitted over a short time period corresponding to a few (for example, 1 or 2) OFDM symbols within the slot is referred to as a short PUCCH.

On the other hand, a PUCCH consisting of more than a predetermined number (for example, 4) of OFDM symbols and being transmitted over a relatively long time period within a slot is called a long PUCCH.

As one example, when uplink control information (UCI) to be transmitted to the short PUCCH contains a tiny amount of information (for example, 1 bit or 2 bits), a base station may allocate a sequence set consisting of a plurality of sequences to a UE as short PUCCH resources, and the UE may select and transmit a specific sequence corresponding to the UCI to be transmitted among the sequences allocated as short PUCCH resources.

At this time, the sequence may be designed to satisfy low peak power to average power ratio (PAPR) property. In what follows, for the convenience of description, the sequence-based short PUCCH structure is called SEQ-PUCCH.

Meanwhile, when UCI to be transmitted to the short PUCCH contains a large amount of information (for example, more than 3 bits), the base station may allocate a short PUCCH resource consisting of Resource Elements (REs) for UCI transmission and REs for reference signal (RS) transmission to the UE.

At this time, the REs for RS transmission and the REs for UCI transmission may be distinguished according to the FDM scheme for each symbol, and the UE may generate coded bits for the UCI and then transmit modulated symbols for the coded bits to the REs for UCI transmission. In what follows, for the convenience of description, the short PUCCH structure in which the FDM scheme is applied between the RS and the UCI (for each symbol) is called FDM-PUCCH.

Meanwhile, in the NR system, a semi-persistent CSI (hereinafter, SP-CSI) transmission operation that transmits channel state information (CSI) at a predetermined period during a predetermined time period is being considered.

The SP-CSI transmission may be considered to be a kind of multi-shot transmission scheme within a predetermined time period.

More specifically, a base station may configure a CSI reporting period and a physical uplink shared channel (PUSCH) resource for CSI transmission (for example, time and frequency resource) for a UE through higher layer signaling such as RRC signaling and may subsequently instruct activation/release of SP-CSI transmission utilizing the CSI reporting period and the CSI transmission PUSCH resource through downlink control information (DCI) (for example, uplink (UL) grant). At this time, the UE may perform CSI report transmission according to the period and the resource only during the activated time period, and the SP-CSI report transmitted through the period and the resource may be made up of one or more CSI parts (for example, CSI part 1 and CSI part 2).

The present disclosure proposes a UE operation for a case when the SP-CSI is transmitted to a PUSCH resource and the SP-CSI transmission PUSCH collides with another PUCCH or PUSCH and additionally proposes a resource allocation method when the SP-CSI is transmitted to a PUSCCH resource.

In what follows, in the present disclosure, a PUCCH resource may include information on PUCCH transmission timing (for example, starting slot and starting symbol), PUCCH duration (for example, number of symbols in a slot), physical resource block (PRB) allocation (for example, starting PRB index and number of PRBs), frequency hopping enable/disable, and code domain resource (for example, initial cyclic shift, time domain OCC, and pre-DFT OCC).

In what follows, in the present disclosure, aperiodic CSI (A-CSI) refers to the CSI reported non-periodically, and periodic CSI (P-CSI) refers to the CSI reported periodically. Also, in what follows, a PUSCH transmitting the SP-CSI as if UL data is called an SP-CSI transmission PUSCH.

In what follows, in the present disclosure, it is assumed that at least specific UEs are able to transmit only one UL channel at the same time to maintain a single carrier property (under a specific condition) (or the low PAPR or low cubic metric property).

More specifically, in what follows, (when semi-persistent transmission of CSI utilizing a PUSCH or PUCCH resource (namely an operation transmitting CSI at a predetermined period during a predetermined time period) is supported in a wireless communication system comprising a base station and a UE) 1. a UE operation at the time of collision between a PUSCH transmitting the SP-CSI and another UL physical channel (for example, a PUCCH or a PUSCH) is described first, 2. a method for PUCCH resource allocation for SP-CSI transmission when SP-CSI is transmitted to a PUCCH resource is described, and then 3. in which scheme SP-CSI is transmitted on the PUSCH is described.

1. Collision Handling Method when a PUSCH Transmitting SP-CSI Collides with Another UL Physical Channel (for Example, a PUCCH or a PUSCH)

As described above, a UE may be instructed by (single piece or a plurality of; the same or different pieces of) DCI to perform transmission of a PUSCH related to the SP-CSI or transmission of another UL physical channel at the same time (the time point at which transmission are partially or fully overlapped). Under this situation, when the UE is able to transmit only one uplink channel at the same time, if it is unclear to the UE which channel is to be transmitted first, there is a chance that important information the UE has to transmit may not be transmitted.

Therefore, the present disclosure provides descriptions about which transmission is to be performed or not to be performed (namely transmission to be dropped) by the UE when transmission of a PUSCH related to SP-CSI collides with transmission of another UL physical channel.

Although not described through a separate drawing, the description above may be generalized as follows. A UE may receive control information (for example, DCI) from a base station. After receiving control information, the UE determines whether transmission of a PUSCH related to SP-CSI overlaps transmission of another UL physical channel over time. Afterwards, based on the determination above, the UE performs the transmission of a PUSCH related to SP-CSI or the transmission of another UL physical channel.

In what follows, a collision handling method when a PUSCH transmitting SP-CSI collides with another uplink channel will be described in more detail.

<Collision Handling Method when a PUSCH Transmitting SP-CSI Collides with a PUCCH>

[Proposed Method #1]

(1) Opt. 1: Only the UCI-X transmission (short) PUCCH resource is transmitted. The SP-CSI transmission may be omitted.

(2) Opt. 2: Only the SP-CSI transmission PUSCH resource is transmitted. The UCI-X transmission may be omitted.

(3) Opt. 3: The UCI-X may be transmitted by being piggybacked onto the SP-CSI transmission PUSCH. The PUCCH transmission may be omitted.

(4) Opt. 4: Both the UCI-X and the SP-CSI may be transmitted to the PUSCH or PUCCH resource.

A. However, the UCI-X and the SP-CSI may be jointly or separately coded, and when the UCI-X and the SP-CSI are transmitted to the PUSCH, the UCI-X and the SP-CSI may be mapped to resource elements (REs) like UL data.

B. However, the PUSCH/PUCCH resource may be a resource allocated with respect to the UCI-X and the SP-CSI or a resource configured separately.

(5) Opt. 5: The SP-CSI transmission PUSCH and the UCI-X transmission (short) PUCCH may be TDMed to be transmitted.

A. However, the SP-CSI within a symbol interval overlapping the UCI-X transmission (short) PUCCH resource within the SP-CSI transmission PUSCH may be punctured.

However, the base station may instruct the UE to follow a specific operation among the options above through a higher layer signal and/or DCI. Or the UE may follow a specific operation among the options depending on a specific condition.

However, the SP-CSI may be transmitted according to the encoding/mapping process the same used for general UL data within the PUSCH.

As one example, when the UE transmits SP-CSI to the PUSCH resource, the SP-CSI transmission PUSCH and the (short) PUCCH resource transmitting another specific UCI-X (for example, HARQ-ACK, P-CSI, A-CSI, or SR) may have a (partially) overlapping time-axis transmission resource.

In this case, the UE may transmit only the UL channel containing UCI having higher priority (Opt. 1 or Opt.2) or transmit the SP-CSI and the UCI-X to the same PUSCH or PUCCH resource (Opt. 3 or Opt. 4).

At this time, when the SP-CSI and the UCI-X are transmitted together to the PUSCH, the SP-CSI may be transmitted in the form of data while the UCI-X may be transmitted in a UCI piggyback form or both the SP-CSI and the UCI-X may be transmitted in the form of data. When the UCI-X transmission PUCCH resource is a short PUCCH resource, the UCI-X may be transmitted by puncturing part of the symbol interval of the SP-CSI transmission PUSCH and applying TDM to the UCI-X transmission (short) PUCCH.

The [Proposed method #1] may be applied in conjunction with other proposed methods as long as the [Proposed method #1] does not conflict with the other proposed methods.

<Collision Handling Method when a PUSCH Transmitting SP-CSI Collides with (Another) PUSCH>

[Proposed Method #2]

When an SP-CSI transmission PUSCH resource (PUSCH 1) and a UL data transmission PUSCH resource (PUSCH 2) indicated to be transmitted by the same UE (through different pieces of DCI or through the same DCI) have a (partially) overlapping time-axis transmission resource, the UE may operate as follows.

(1) Opt. 1: SP-CSI is transmitted to the PUSCH 2 by being piggybacked onto the UCI. PUSCH 1 transmission may be omitted.

(2) Opt. 2: Only PUSCH 2 is transmitted. The SP-CSI transmission may be omitted.

A. In the case above, PUSCH 2 may be a PUSCH due to dynamic scheduling, and the corresponding scheduling may override PUSCH 1.

(3) Opt. 3: CSI part 1 and 2 with respect to the SP-CSI may be transmitted by the PUSCH 1 and the PUSCH 2, respectively.

A. However, the CSI part transmitted to the PUSCH 1 may be transmitted in the form of data while the CSI part transmitted to the PUSCH 2 may be transmitted in the form of a UCI piggyback.

However, the base station may instruct the UE to follow a specific operation among the options through a higher layer signal and/or DCI.

As one example, when the UE transmits SP-CSI to the PUSCH resource, the SP-CSI transmission PUSCH and the PUSCH resource transmitting actual UL data may have a (partially) overlapping transmission resource in time.

In the case above, since the UE performs scheduling of the UL data transmission PUSCH (PUSCH 2) even though the UE is aware of existence of the SP-CSI transmission PUSCH (PUSCH 1), the UE may put a high priority for the data scheduling PUSCH (PUSCH 2).

At this time, the SP-CSI may be transmitted to the data scheduling PUSCH (PUSCH 2) by being piggybacked onto the UCI (Opt. 1), or transmission thereof may be omitted (Opt. 2). Or, when the UE is able to transmit both of the two PUSCHs, the SP-CSI is divided into two parts to be transmitted to the PUSCH allocated for the SP-CSI (PUSCH 1) and the data PUSCH (PUSCH 2), respectively.

At this time, the CSI part transmitted to the PUSCH for SP-CSI (PUSCH 1) may be transmitted in the form of data while the CSI part transmitted to the data scheduling PUSCH (PUSCH 2) may be transmitted in the form of a UCI piggyback.

For the convenience of understanding, among descriptions of the [Proposed method #2] (namely, one example of a method for transmitting a PUSCH related to SP-CSI by a UE), an example of the Opt. 2 is recapped but from the overall perspective including the UE and the base station with reference to a related drawing as follows.

Figure 9:
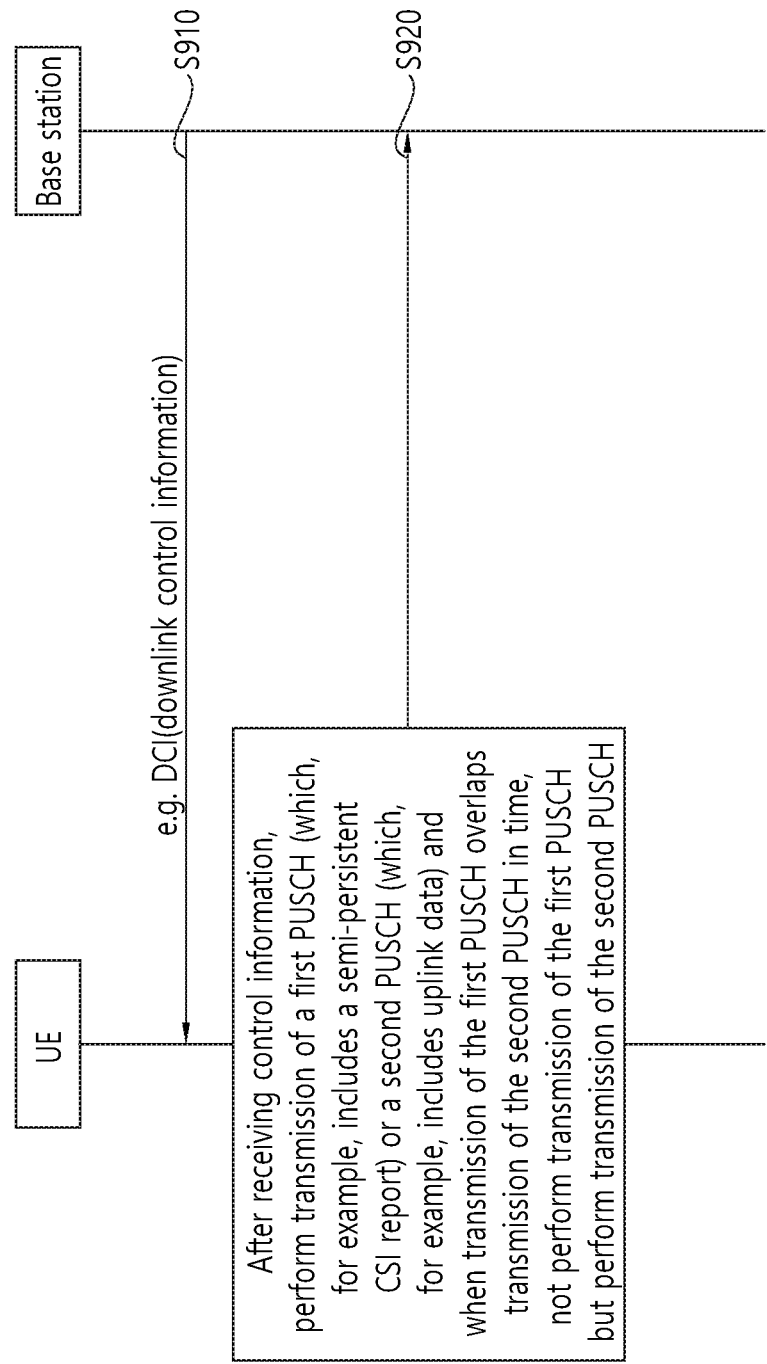
FIG. 9 is a flow diagram illustrating an embodiment of a method for transmitting a PUSCH related to SP-CSI according to one embodiment of the present disclosure.

FIG. 9 is a flow diagram illustrating an embodiment of a method for transmitting a PUSCH related to SP-CSI according to one embodiment of the present disclosure.

Referring to FIG. 9, the UE may receive control information (for example, downlink control information (DCI)) from the base station S910.

For example, the UE may be instructed to perform activation/release of SP-CSI transmission having the CSI reporting period and the CSI transmission PUSCH resource. Here, since examples related to the DCI are the same as described previously, repeated descriptions thereof will be omitted for the convenience of description.

Afterwards, the UE performs transmission of a first PUSCH (which, for example, includes a semi-persistent CSI report) or transmission of a second PUSCH (which, for example, includes uplink data) after receiving control information S920. In other words, after receiving control information, the UE may transmit at least one or more of the first PUSCH and/or the second PUSCH.

Here, when transmission of the first PUSCH is overlapped with transmission of the second PUSCH in time, the UE may not perform transmission of the first PUSCH but perform transmission of the second PUSCH.

In other words, when transmission time of a PUSCH including a semi-persistent CSI report overlaps transmission time of a PUSCH including uplink data in time, the UE may not perform transmission of the PUSCH (or the PUSCH related to semi-persistent CSI) including the semi-persistent CSI report (in other words, drops transmission of the PUSCH including the semi-persistent CSI report) but perform transmission of the PUSCH including uplink data (namely, the PUSCH related to uplink data).

Here, as one example, the control information may be downlink control information (DCI). Also, as one example, the control information may be received from the base station. Also, as one example, the first PUSCH or the second PUSCH may be transmitted to the base station. Also, as one example, the semi-persistent CSI may be CSI transmitted at a predetermined period during a predetermined time period. Also, as one example, the uplink data may be an uplink shared channel (UL-SCH).

Here, the aforementioned first PUSCH (which, for example, includes a semi-persistent CSI report) and/or the second PUSCH (which, for example, includes uplink data) may indicate the PUSCH related to a subframe (or TTI) described above (for example, FIG. 6 and/or FIG. 8). In other words, as described above, the first PUSCH and/or the second PUSCH may be a PUSCH in a subframe consisting of 14 symbols.

The content of FIG. 9 may be described in another way as follows. First, the UE determines whether transmission of the first PUSCH overlaps transmission of the second PUSCH in time. Afterwards, the UE may transmit the first PUSCH or the second PUSCH to the base station based on the determination result (namely, the UE may transmit at least one or more of the first PUSCH and/or the second PUSCH). At this time, the first PUSCH is a PUSCH related to semi-persistent CSI, and the second PUSCH is a PUSCH related to uplink data; when transmission of the first PUSCH overlaps transmission of the second PUSCH in time, the UE may not perform transmission of the first PUSCH but perform transmission of the second PUSCH. Furthermore, the first PUSCH or the second PUSCH may be transmitted based on DCI.

According to the embodiment of FIG. 9, if the UE is allowed to transmit only one uplink channel at the same time instant, it may be necessary to clearly prioritize channels for transmission. More specifically, if the UE transmits a PUSCH for uplink data first, which is relatively more important than a PUSCH related to SP-CSI, the base station may receive relatively important information in a reliable manner, by which stability of wireless communication may be improved.

As an alternative, another scheme may be considered, where SP-CSI is transmitted by being TDMed with the data on the second PUSCH while transmission of the first PUSCH is dropped; in this case, if the UE fails to detect control information indicating activation of SP-CSI transmission, inconsistency may occur between the UE and the base station regarding the SP-CSI and existence of the corresponding first PUSCH. This may eventually cause inconsistency between the UE and the base station regarding the data mapping position on the second PUSCH, which may greatly reduce data transmission performance.

Therefore, as described above, if the UE transmits a PUSCH for uplink data first, which is relatively more important than a PUSCH related to SP-CSI, the base station may receive relatively important information in a reliable manner, by which stability of wireless communication may be improved.

The content of FIG. 9 may be described from the perspective of a UE as follows.

Figure 10:
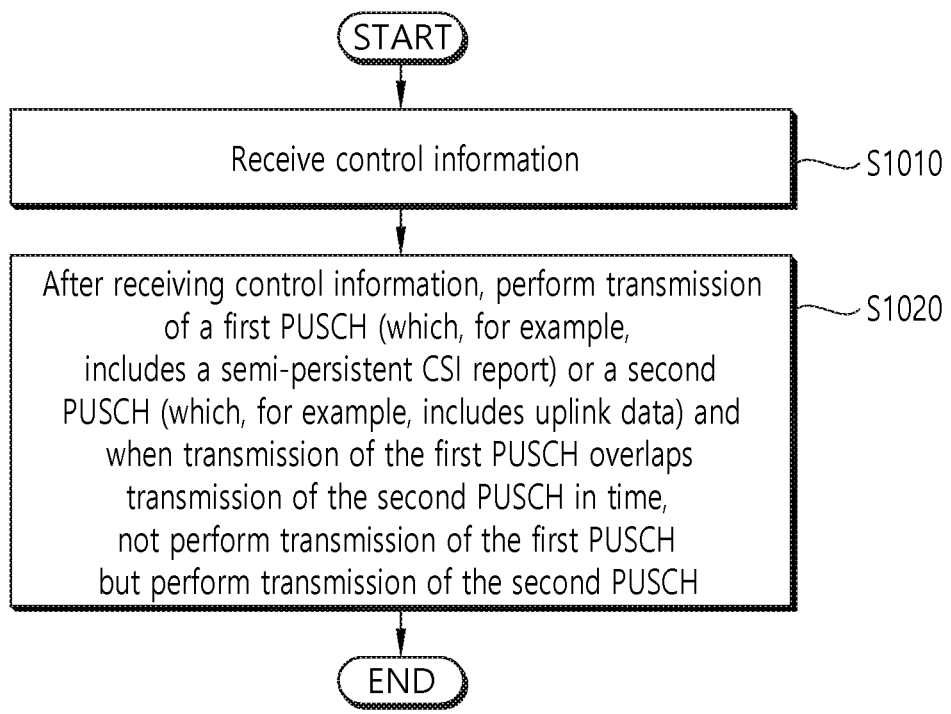
FIG. 10 is a flow diagram illustrating an embodiment of a method for transmitting a PUSCH related to SP-CSI from the perspective of a UE.

FIG. 10 is a flow diagram illustrating an embodiment of a method for transmitting a PUSCH related to SP-CSI from the perspective of a UE.

According to FIG. 10, the UE may receive control information from the base station S1010. The control information may indicate the DCI as described above; since a specific example of the DCI is the same as described previously, repeated descriptions thereof will be omitted for the convenience of description.

Afterwards, the UE performs transmission of a first PUSCH (which, for example, includes a semi-persistent CSI report) or transmission of a second PUSCH (which, for example, includes uplink data) after receiving control information. When transmission of the first PUSCH is overlapped with transmission of the second PUSCH in time, the UE may not perform transmission of the first PUSCH but perform transmission of the second PUSCH S1020. Since a specific example of the operation above is the same as described previously, repeated descriptions thereof will be omitted for the convenience of description.

Figure 11:
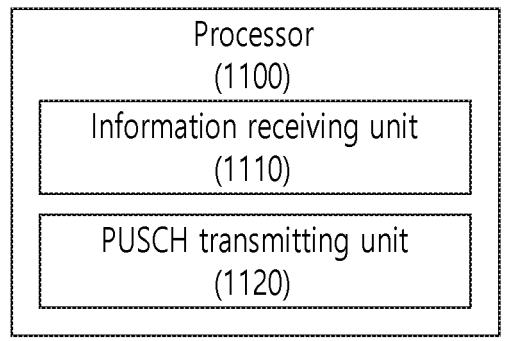
FIG. 11 is a block diagram illustrating an embodiment of a device transmitting a PUSCH related to SP-CSI from the perspective of a UE.

FIG. 11 is a block diagram illustrating an embodiment of a device transmitting a PUSCH related to SP-CSI from the perspective of a UE.

According to FIG. 11, the processor 1100 may comprise an information receiving unit 1110 and a PUSCH transmitting unit 1120. Here, the processor may indicate a processor of a UE in FIGS. 14 to 20 to be described later.

The information receiving unit 1110 may receive control information from the base station. The control information may indicate the DCI as described above; since a specific example of the DCI is the same as described previously, repeated descriptions thereof will be omitted for the convenience of description.

Afterwards, the PUSCH transmitting unit 1120 may perform transmission of a first PUSCH (which, for example, includes a semi-persistent CSI report) or transmission of a second PUSCH (which, for example, includes uplink data) after receiving control information. When transmission of the first PUSCH is overlapped with transmission of the second PUSCH in time, the PUSCH transmitting unit 1120 may not perform transmission of the first PUSCH but perform transmission of the second PUSCH S1020. Since a specific example of the operation above is the same as described previously, repeated descriptions thereof will be omitted for the convenience of description.

The content of FIG. 9 may be described from the perspective of a base station as follows.

Figure 12:
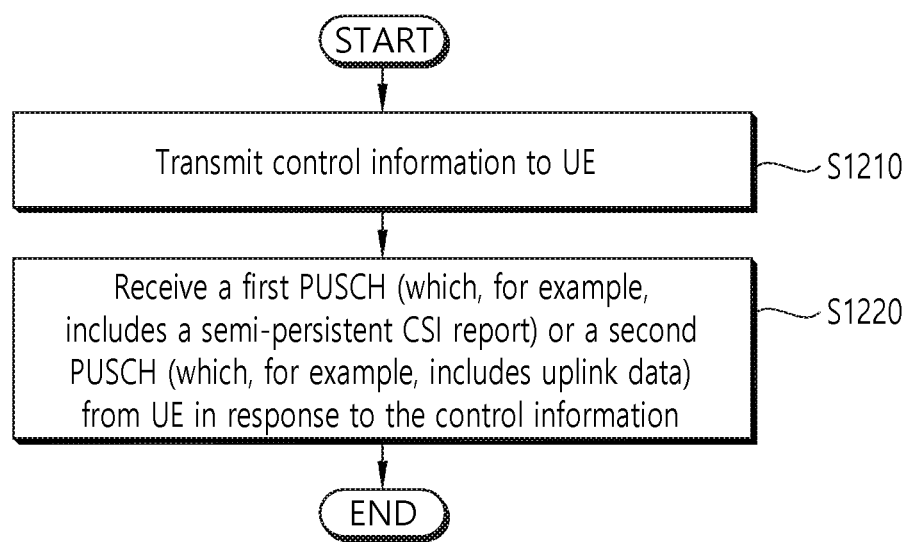
FIG. 12 is a flow diagram illustrating an embodiment of a method for receiving a PUSCH related to SP-CSI from the perspective of a base station.

FIG. 12 is a flow diagram illustrating an embodiment of a method for receiving a PUSCH related to SP-CSI from the perspective of a base station.

According to FIG. 12, the base station may transmit control information to the UE S1210. Here, the control information may indicate the DCI as described above; since a specific example of the DCI is the same as described previously, repeated descriptions thereof will be omitted for the convenience of description.

Afterwards, the base station may receive a first PUSCH (which, for example, includes a semi-persistent CSI report) or a second PUSCH (which, for example, includes uplink data) from the UE as a response to the control information S1220. As described above, when transmission of the first PUSCH and transmission of the second PUSCH by the UE overlap with each other in time, the base station may receive the second PUSCH in the time domain. Since a specific example of the operation above is the same as described previously, repeated descriptions thereof will be omitted for the convenience of description.

Figure 13:
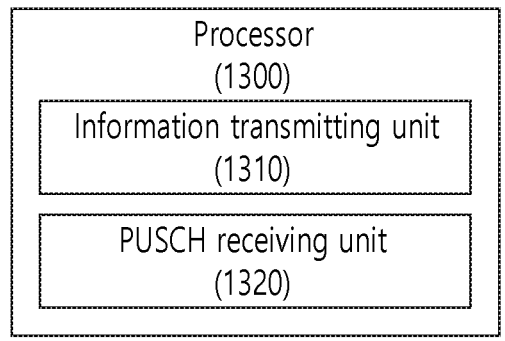
FIG. 13 is a block diagram illustrating an embodiment of a device receiving a PUSCH related to SP-CSI from the perspective of a base station.

FIG. 13 is a block diagram illustrating an embodiment of a device receiving a PUSCH related to SP-CSI from the perspective of a base station.

According to FIG. 13, the processor 1300 may comprise an information transmitting unit 1310 and a PUSCH receiving unit 1320. Here, the processor may indicate a processor of a base station in FIGS. 14 to 20 to be described later.

According to FIG. 13, the information transmitting unit 1310 may transmit control information to the UE. Here, the control information may indicate the DCI as described above; since a specific example of the DCI is the same as described previously, repeated descriptions thereof will be omitted for the convenience of description.

Afterwards, the PUSCH receiving unit 1320 may receive a first PUSCH (which, for example, includes a semi-persistent CSI report) or a second PUSCH (which, for example, includes uplink data) from the UE in response to the control information. When transmission of the first PUSCH and transmission of the second PUSCH by the UE overlap with each other in time, the base station may receive the second PUSCH in the time domain. Since a specific example of the operation above is the same as described previously, repeated descriptions thereof will be omitted for the convenience of description.

The [Proposed method #2] may be applied in conjunction with other proposed methods as long as the [Proposed method #2] does not conflict with the other proposed methods.

In what follows, Medium Access Control-Control Element (MAC-CE) indicates control information indicated by the MAC layer, which is a higher layer than the physical layer (for example, PHY layer).

2. PUCCH Resource Allocation for SP-CSI Transmission when SP-CSI is Transmitted to PUCCH Resource As described above, a UE may transmit SP-CSI. When the UE transmits SP-CSI, and it is not clear how to allocate PUCCH resources for SP-CSI transmission, then it becomes unclear how the UE transmits the SP-CSI.

In this regard, the present disclosure proposes how to allocate PUCCH resources for SP-CSI transmission when a UE transmits the SP-CSI.

Although not described through a separate drawing, the description above may be generalized as follows. First, a UE may receive information on the resources from a base station. Afterwards, based on the received information on the resources, the UE may transmit the SP-CSI on the PUCCH.

In what follows, how to allocate PUCCH resources for SP-CSI transmission when a UE transmits the SP-CSI will be described in more detail.

<Resource allocation for SP-CSI on PUCCH>

[Proposed Method #3]

As described below, a method may be provided, which allocates a PUCCH resource for SP-CSI transmission by a base station when an MAC-CE activates/releases an operation of transmitting SP-CSI to a PUCCH resource.

(1) Opt. 1: Higher layer signaling (for example, RRC signaling) may configure a plurality of PUCCH resources for the UE, and the MAC-CE (and/or DCI) may indicate one of PUCCH resources.

To briefly describe the above operation for the convenience of understanding, although not shown in the figure separately, as one example, the UE may receive information on a plurality of PUCCH resources through higher layer signaling. Afterwards, based on the received information on a plurality of PUCCH resources, one PUCCH resource among the plurality of PUCCH resources may be indicated to the UE, for example, through DCI.

(2) Opt. 2: Higher layer signaling (for example, RRC signaling) may configure a plurality of PUCCH and PUSCH resources for the UE, and the MAC-CE (and/or DCI) may indicate one of PUCCH resource or PUSCH resource.

To briefly describe the above operation for the convenience of understanding, although not shown in the figure separately, as one example, the UE may receive information on a plurality of PUCCH and PUSCH resources through higher layer signaling. Afterwards, based on the received information on a plurality of PUCCH and PUSCH resources, one of PUCCH resource or PUSCH resource among the plurality of PUCCH and PUSCH resources may be indicated to the UE, for example, through DCI.

However, the MAC-CE used for allocation of a PUCCH resource may be an MAC-CE indicating activation.

However, the PUCCH resource for SP-CSI transmission may include information related to frequency hopping (in units of symbols and/or slots).

As one example, the base station may instruct the UE through the MAC-CE to activate or release SP-CSI transmission to a PUCCH resource.

At this time, the base station may configure a plurality of PUCCH resources for the UE in advance through higher layer signaling such as RRC signaling and through the MAC-CE, instruct the UE to use one of the plurality of PUCCH resources for SP-CSI transmission.

To generalize the above operation, the base station may configure a plurality of PUCCH or PUSCH resources for SP-CSI transmission through higher layer signaling such as RRC signaling and through the MAC-CE, subsequently instruct to select one specific PUCCH or PUSCH resource among the plurality of candidate resources to be used for SP-CSI transmission.

The [Proposed method #3] may be applied in conjunction with other proposed methods as long as the [Proposed method #3] does not conflict with the other proposed methods.

[Proposed method #4] As described below, a method may be provided, which releases a PUCCH resource for SP-CSI transmission by a base station when an MAC-CE activates an operation of transmitting SP-CSI to a PUCCH resource.

(1) Opt. 1: A single MAC-CE may indicate release time together with indication of activation.

A. As one example, a time period during which SP-CSI transmission is performed (since the activation time) or the total number of SP-CSI transmissions may be indicated.

However, the UE may report ACK/NACK information related with reception of the MAC-CE to the base station.

In the LTE system, when semi-persistent scheduling (SPS) based PUSCH is activated/released, separate DCI has been used for the corresponding role. However, in the NR system according to an embodiment of the present disclosure, PUCCH-based SP-CSI transmission may be activated by an MAC-CE, and since the MAC-CE is a control signal capable of carrying a relatively larger amount of information than the DCI, the MAC-CE may also carry release information about the corresponding SP-CSI transmission PUCCH. For example, the base station may additionally inform of the information on a time period during which SP-CSI transmission is maintained (since the activation time) through a single MAC-CE.

The [Proposed method #4] may be applied in conjunction with other proposed methods as long as the [Proposed method #4] does not conflict with the other proposed methods.

3. Method for Determining how to Transmit SP-CSI on a PUSCH

<SP-CSI on PUSCH and SPS PUSCH>

[Proposed Method #5]

A method may be provided, by which a specific bit field (for example, CSI request field) that activates/releases a semi-persistent scheduling (SPS) PUSCH is defined and a UE performs one or more operations as described below when activation DCI for the SPS PUSCH requests CSI reporting.

(1) SP-CSI may be transmitted for each SPS PUSCH.

(2) The SP-CSI may be transmitted to the corresponding SPS PUSCH only at the time of SPS PUSCH transmission corresponding to the (periodic) SP-CSI transmission time.

A. However, the base station may configure the transmission period for the SPS PUSCH and the transmission period for the SP-CSI independently through higher layer signaling, and the transmission period for the SP-CSI may be a multiple of the transmission period for the SPS PUSCH.

The above operation may be summarized as follows for the convenience of understanding. First, the UE may receive DCI from the base station. Afterwards, (if CSI reported is requested by the activation DCI) the UE may transmit SP-CSI for each SPS PUSCH based on the received DCI or (2) (if CSI reporting is requested by the activation DCI) the UE may transmit SP-CSI to the corresponding SPS PUSCH based on the received DCI only at the time of SPS PUSCH transmission corresponding to the SP-CSI transmission time.

However, the SP-CSI may be transmitted to the SPS PUSCH according to the UCI piggyback scheme.

As one example, through the DCI that activates the SPS PUSCH, the base station may inform the UE of whether to transmit SP-CSI within the corresponding SPS PUSCH.

When the activation DCI indicates SP-CSI transmission to the SPS PUSCH, it may be assumed that transmission periods of the SPS PUSCH and the SP-CSI are the same to each other, and the SP-CSI may be transmitted for each SPS PUSCH transmission time instant by being included in the SPS PUSCH in a UCI piggyback form. Or, if the base station configures transmission periods of the SPS PUSCH and the SP-CSI to be different from each other, when the activation DCI indicates SP-CSI transmission to the SPS PUSCH, the SP-CSI may be transmitted in a UCI piggyback form by being included only in the SPS-PUSCH corresponding to the SP-CSI transmission time instant (periodically) configured by the base station among SPS PUSCHs.

The [Proposed method #5] may be applied in conjunction with other proposed methods as long as the [Proposed method #5] does not conflict with the other proposed methods.

Figure 14:
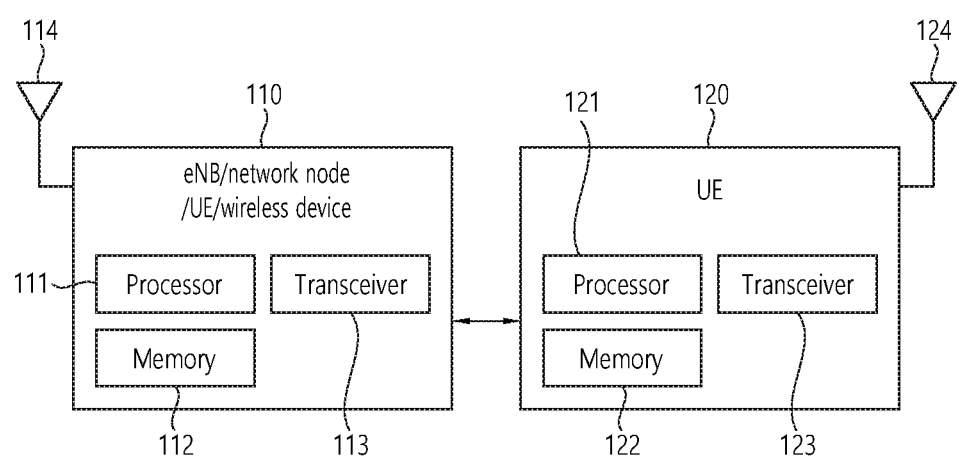
FIG. 14 is a block diagram of a wireless communication device according to an embodiment of the present disclosure.

FIG. 14 is a block diagram of a wireless communication device according to an embodiment of the present disclosure.

Referring to FIG. 14, a wireless communication system may comprise a base station 110 and a UE 120. The UE 120 may be located within coverage of the base station 110. In some use scenario, the wireless communication system may include a plurality of UEs. The example of FIG. 14 includes the base station 110 and the UE 120, but the present disclosure is not limited to the specific arrangement. For example, the base station 110 may be replaced with another network node, a UE, a wireless device, or any other entity similar to the base station 110.

The base station and the UE may represent a wireless communication device or a wireless device, respectively. The base station of FIG. 14 may be replaced with a network node, a wireless device, or a UE.

The base station 110 may include at least one processor such as the processor 111, at least one memory such as the memory 112, and at least one transceiver such as the transceiver 113. The processor 111 may perform the aforementioned functions, procedures, and/or methods shown in FIGS. 6 to 11. The processor 111 may perform one or more protocols. For example, the processor 111 may perform one or more layers (for example, functional layer) of a radio interface protocol. The memory 112 may be coupled to the processor 111 and may store various types of information and/or commands. The transceiver 113 may be coupled to the processor 111 and may be controlled to transmit and receive a radio signal.

The UE 120 may include at least one processor such as the processor 121, at least one memory such as the memory 122, and at least one transceiver such as the transceiver 123.

The processor 121 may perform the aforementioned functions, procedures, and/or methods shown in FIGS. 9 to 18. The processor 121 may perform one or more protocols. For example, the processor 121 may perform one or more layers (for example, functional layer) of a radio interface protocol. The memory 122 may be coupled to the processor 121 and may store various types of information and/or commands. The transceiver 123 may be coupled to the processor 121 and may be controlled to transmit and receive a radio signal.

The memory 112 and/or the memory 122 may be connected internally or externally to the processor 111 and/or the processor 121, respectively or may be connected to other processors through various techniques such as wired or wireless connections.

The base station 110 and/or the UE 120 may have one or more antennas. For example, the antenna 114 and/or the antenna 124 may be configured to transmit and receive a radio signal.

Figure 15:
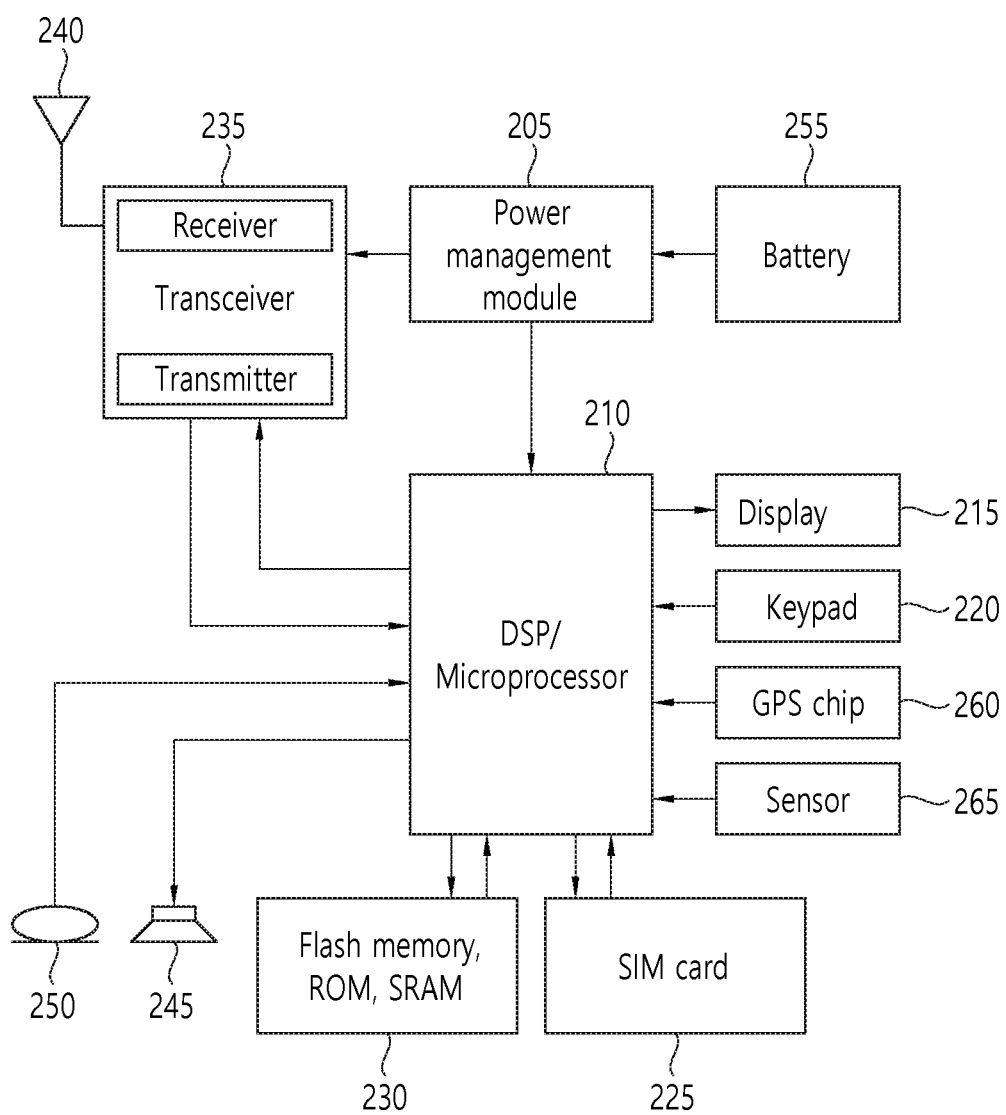
FIG. 15 is one example of a wireless communication device in which an embodiment of the present disclosure is implemented.

FIG. 15 is one example of a wireless communication device in which an embodiment of the present disclosure is implemented.

In particular, FIG. 15 illustrates the UE 100 of FIG. 14 in more detail. Like a vehicle communication system or device, a wearable device, a portable computer, or a smartphone, the UE may be a mobile computing device of arbitrary type configured suitably to perform one or more implementations of the present disclosure.

Referring to FIG. 15, the UE may comprise at least one processor such as the processor 210 (for example, a DSP or a microprocessor), a transceiver 235, a power management module 205, an antenna 240, a battery 255, a display 215, a keypad 220, a GPS chip 260, a sensor 265, a memory 230, a Subscriber Identification Module (SIM) card 225 (this element may be optional), a speaker 245, and a microphone 250. The UE may also include one or more antennas.

The processor 210 may be configured to perform the functions, processes and/or methods described with reference to FIGS. 9 to 18. Depending on the implementation example, the processor 210 may perform one or more protocols in conjunction with the layers of a radio interface protocol (for example, functional layers).

The memory 230 is connected to the processor 210 and stores information related to the operation of the processor 210. The memory may be installed inside or outside the processor and may be connected to other processors through various techniques such as wired or wireless connections.

A user may input various types of information (for example, command information such as a phone number) by pressing buttons of the keypad 220 or using various techniques such as voice activation using the microphone 250. The processor receives and processes the command information of the user and performs a proper function such as calling the phone number. As one example, data (for example, operational data) may be retrieved from the SIM card 225 or the memory 230 to perform functions. As another example, the processor may receive and process GPS information from the GPS chip 260 to perform a function associated with the position of the device, such as vehicle navigation and a map service. As yet another example, the processor may display various types of information and data on the display 215 for the reference or convenience of the user.

The transceiver 235 is connected to the processor and transmits and receives a radio signal such as a Radio Frequency (RF) signal. The processor may control the transceiver to initiate communication and transmit a radio signal including various types of information or data such as voice communication data. The transceiver includes one receiver and one transceiver to transmit or receive radio signals. The antenna 240 facilitates transmission and reception of radio signals. Depending on implementation, the transceiver may forward and convert radio signals to baseband signals to involve the processor in receiving the signals. The processed signals may be transformed by various techniques into the information that may be output and heard through the speaker 245 or into readable information.

Depending on implementation, the sensor 265 may be connected to the processor. The sensor may include one or more detection devices configured to detect various forms of information including but not limited to velocity, acceleration, light, vibration, proximity, position, and image. The processor may receive and process sensor information obtained from the sensor and perform various forms of functions such as collision prevention and automated driving.

In the example of FIG. 15, various constituting elements (for example, a camera or a USB port) may be additionally included in the UE. For example, the camera may be connected to the processor and used for various services such as automated driving and vehicle safety service.

As described above, FIG. 15 is only an example, and implementation is not limited to the specific example. For example, a few of constituting elements (for example, the keypad 220, the GPS chip 260, the sensor 265, the speaker 245 and/or the microphone 250) may not be implemented for a particular scenario.

Figure 16:
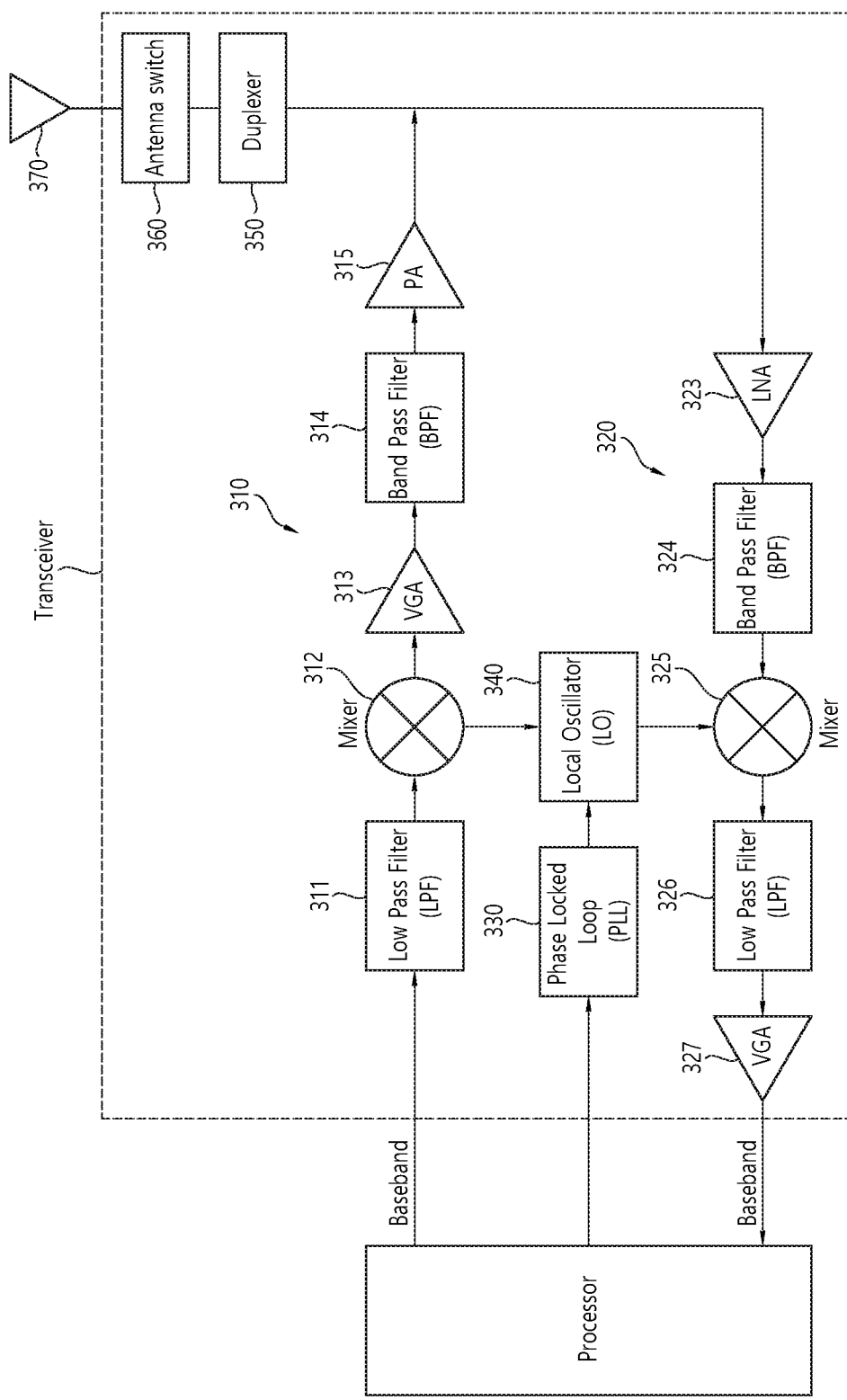
FIG. 16 illustrates an example of a transceiver of a wireless communication device according to an embodiment of the present disclosure.

FIG. 16 illustrates an example of a transceiver of a wireless communication device according to an embodiment of the present disclosure.

In particular, FIG. 16 illustrates an example of a transceiver that may be implemented in a frequency division duplex (FDD) system.

On the transmission path, like the processor described in FIGS. 14 and 15, at least one processor may process data to be suitable for transmission and forward a signal such as an analog output signal to the transmitter 310.

According to the example above, in the transmitter 310, an analog output signal is filtered by the low-pass filter (LPF) 311, for example, to remove noise due to digital-to-analog conversion (ADC) in the previous stage, up-converted from a baseband frequency to an RF frequency by an up-converter (for example, the mixer) 312, and amplified by an amplifier such as the variable gain amplifier (VGA) 313. The amplified signal is filtered by the filter 314, amplified by the power amplifier (PA) 315, routed through duplexer(s) 350/antenna switch(es) 360 and transmitted through the antenna 370.

On the reception path, the antenna 370 receives a signal in a radio environment, and received signals are routed by the antenna switch(es) 360/duplexer(s) 350 and forwarded to the receiver 320.

In the example above, a signal received by the receiver 320 is amplified by an amplifier such as the low noise amplifier (LNA) 323, filtered by the bandpass filter 324, and down-converted from the RF frequency to the baseband frequency by the down-converter (for example, mixer) 325.

The down-converted signal is filtered by the lowpass filter (LPF) 326, amplified by an amplifier such as the VGA 327 to obtain an analog input signal, where the analog input signal is provided to one or more processors such as the processors of FIGS. 14 and 15.

Furthermore, the local oscillator (LO) 340 generates LO signals for transmission and reception and provides the LO signals to the up-converter 312 and the down-converter 325, respectively.

In some implementation, the phase-locked loop (PLL) 330 may receive control information from the processor and send control signals to the LO generator 340 to generate LO signals for transmission and reception at appropriate frequencies.

The implements are not limited to the specific arrangement as shown in FIG. 16, and various constituting elements and circuits may be arranged differently from the example of FIG. 16.

Figure 17:
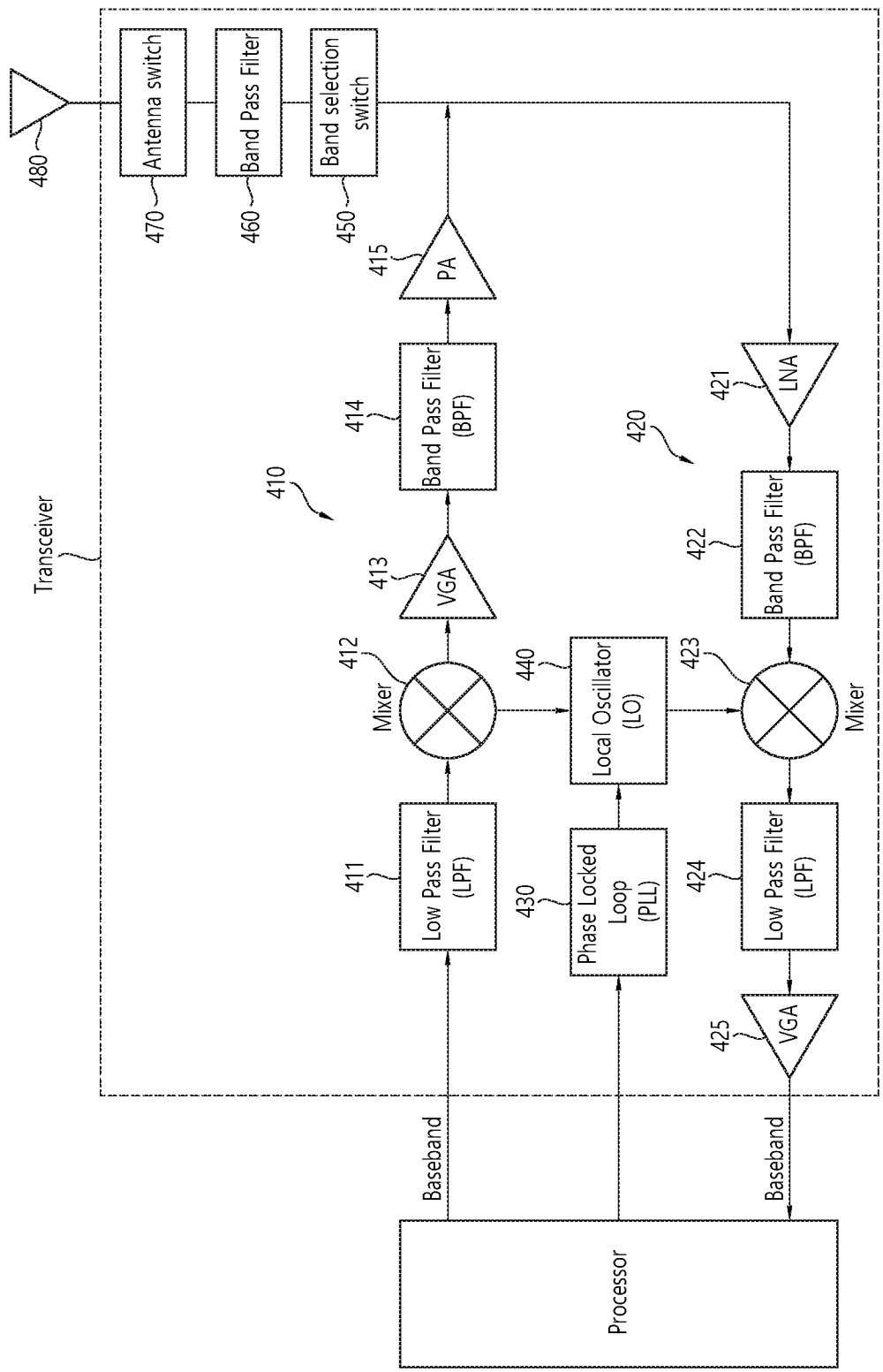
FIG. 17 illustrates another example of a transceiver of a wireless communication device according to an embodiment of the present disclosure.

FIG. 17 illustrates another example of a transceiver of a wireless communication device according to an embodiment of the present disclosure.

In particular, FIG. 17 illustrates an example of a transceiver that may be implemented in a time division duplex (TDD) system.

According to the implementation, the transmitter 410 and the receiver 420 of the transceiver of the TDD system may have one or more properties similar to the transmitter and the receiver of the transceiver of the FDD system.

In what follows, the structure of the transceiver of the TDD system will be described.

On the transmission path, a signal amplified by the power amplifier (PA) 415 of the transmitter is routed through the band selection switch 450, bandpass filter (BPF) 460, and antenna switch(es) 470, and forwarded to the antenna.

On the reception path, the antenna 480 receives signals in a radio environment, where the received signals are routed through the antenna switch(es) 470, bandpass filter (BPF) 460, and band selection switch 450 to be provided to the receiver 420.

Figure 18:
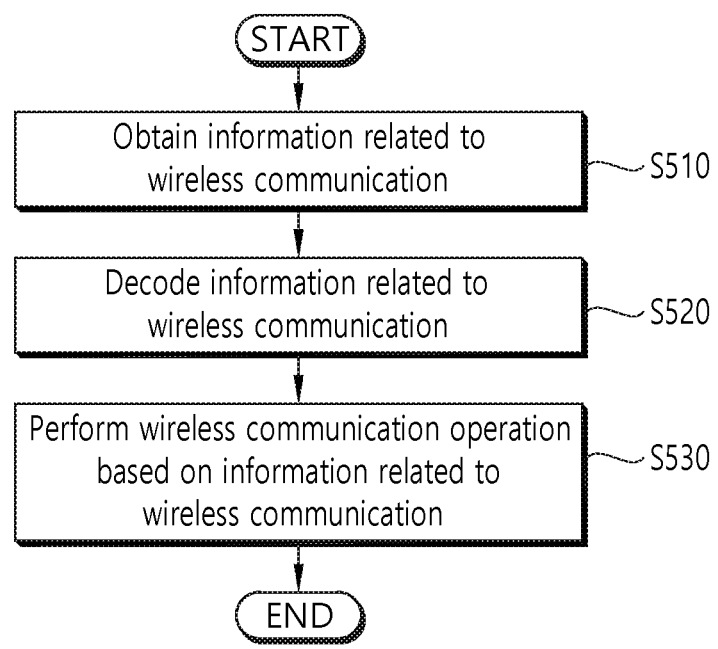
FIG. 18 illustrates operations of a wireless device related to wireless communication.

FIG. 18 illustrates operations of a wireless device related to wireless communication.

The wireless device operations related to wireless communication described in FIG. 18 are only an example, and wireless communication operations using various techniques may be performed in the wireless device. For wireless communication, various forms of information may be delivered.

In the example above, the wireless device obtains information related to wireless communication S510. Information related to wireless communication may be one or more resource configurations. Information related to wireless communication may be obtained from another wireless device or from a network node.

After obtaining information, the wireless device decodes information related to wireless communication S520.

After decoding information related to wireless communication, the wireless device performs one or more wireless communication operations based on the information related to wireless communication S530. Here, the wireless communication operation(s) performed by the wireless device may correspond to one or more operations described herein.

Figure 19:
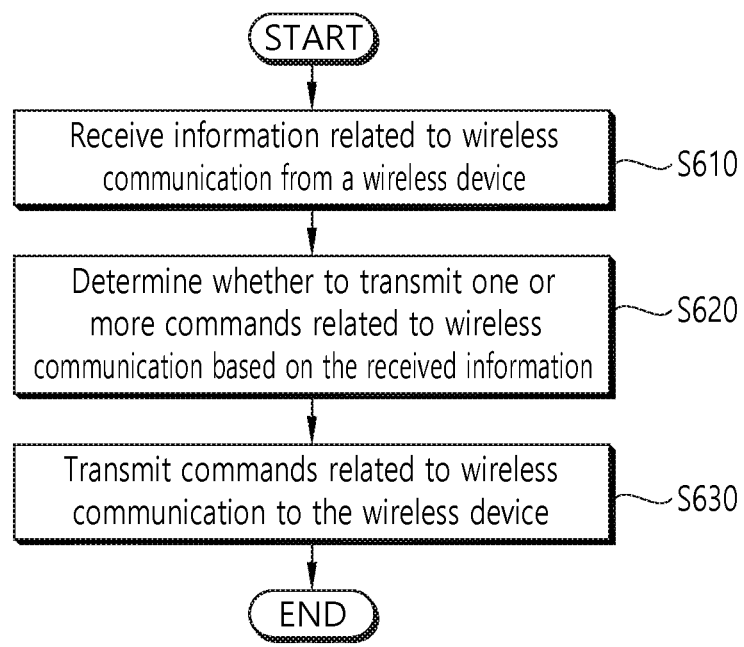
FIG. 19 illustrates an example of a network node operation related to wireless communication.

FIG. 19 illustrates an example of a network node operation related to wireless communication.

The network node operations related to wireless communication described in FIG. 19 are only an example, and wireless communication operations using various techniques may be performed in the network node.

The network node receives information on wireless communication from the wireless device S610. For example, information related to wireless communication may indicate information used to inform the network node of wireless communication information.

After receiving the information, the network node determines, based on the received information, whether to transmit one or more commands related to wireless communication S620.

According to the decision of the network node to transmit a command, the network node transmits a command(s) related to wireless communication to the wireless device S630. Depending on the implementation, after receiving a command transmitted by the network node, the wireless device may perform one or more wireless communication operation(s) based on the received command.

Figure 20:
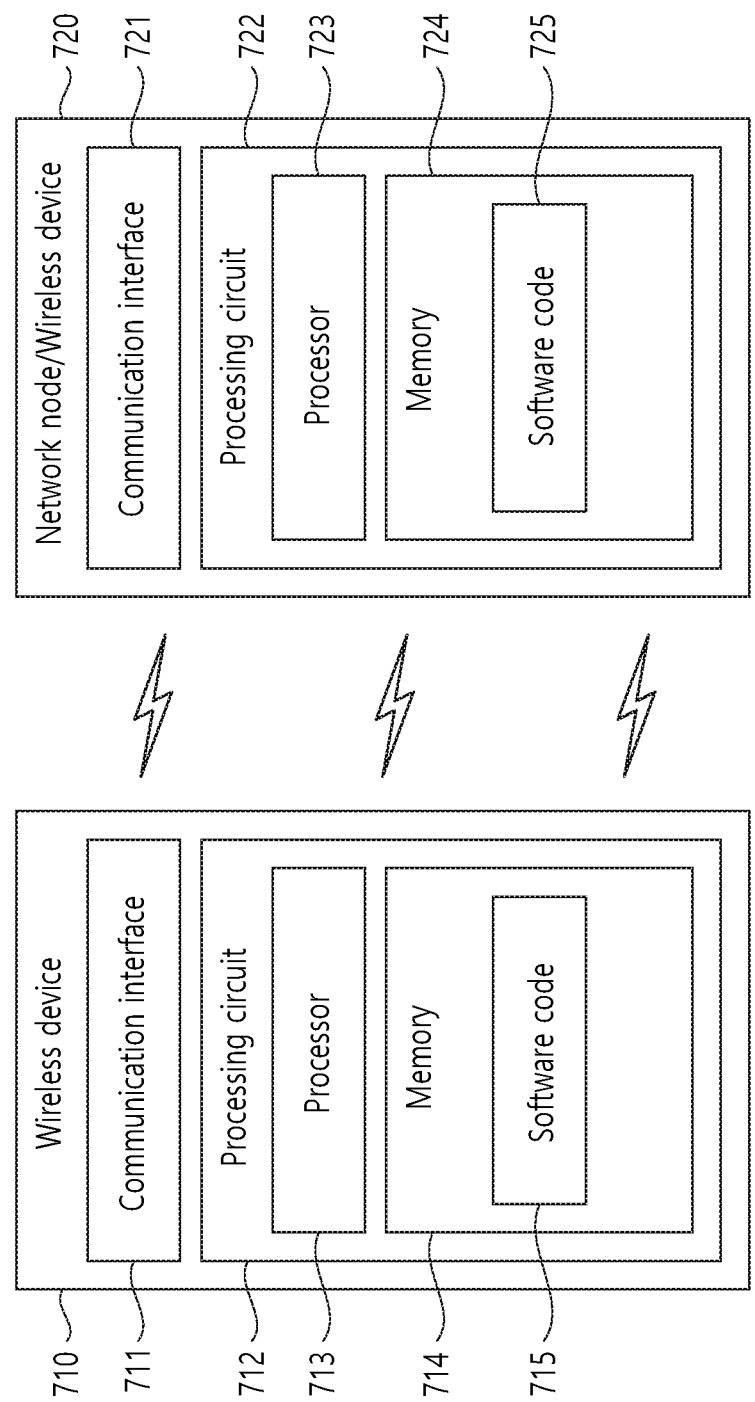
FIG. 20 is a block diagram illustrating an example of communication between a wireless device 710 and a network node 720.

FIG. 20 is a block diagram illustrating an example of communication between a wireless device 710 and a network node 720.

The network node 720 may be replaced with the wireless device or the UE of FIG. 20.

In the example above, the wireless device 710 includes one or more different wireless devices, network nodes and/or a communication interface 711 for communicating with other elements within a network. The communication interface 711 may include one or more transmitters, one or more receivers and/or one or more communication interfaces. The wireless device 710 includes a processing circuit 712. The processing circuit 712 may include one or more processors such as the processor 713 and one or more memories such as the memory 714.

The processing circuit 712 may be configured to control arbitrary methods and/or processes disclosed in the present disclosure and/or, for example, to allow the wireless device 710 to perform the methods and/or processes. The processor 713 corresponds to one or more processors for performing wireless device functions disclosed in the present disclosure. The wireless device 710 includes a memory 714 configured to store data, program software code and/or other information disclosed in the present disclosure.

In one or more implementations, when one or more processors such as the processor 713 are executed, the memory 714 is configured to store software code 715 including commands that instruct the processor 713 to perform the whole or part of the process descried in detail with respect to the implementation example of FIG. 20 and the present disclosure.

For example, one or more processors such as the processor 713 controlling one or more transceivers such as the transceiver 123 of FIG. 14 to transmit and receive information may perform one or more processes related to transmission and reception of information.

The network node 720 includes one or more different network nodes, wireless devices and/or a communication interface 721 for communicating with other elements on the network. Here, the communication interface 721 includes one or more transmitters, one or more receivers and/or one or more communication interfaces. The network node 720 includes a processing circuit 722. Here, the processing circuit includes a processor 723 and a memory 724.

In many implementations, when one or more processors such as the processor 723 are executed, the memory 724 is configured to store software code 725 including commands that instruct the processor 723 to perform the whole or part of the process descried in detail with respect to the implementation example of FIG. 20 and the present disclosure.

For example, one or more processors such as the processor 723 controlling one or more transceivers such as the transceiver 113 of FIG. 14 to transmit and receive information may perform one or more processes related to transmission and reception of information.

What is claimed is:

1. A method for transmitting a first physical uplink shared channel (PUSCH) or a second PUSCH in a wireless communication, the method performed by a user equipment (UE) and comprising:
    receiving, from a base station, downlink control information (DCI) via a physical layer,
    wherein the physical layer is different from a radio resource control (RRC) layer; and
    transmitting, to the base station and after receiving the DCI, one of the first PUSCH or the second PUSCH based on whether a transmission of the first PUSCH would overlap in time with a transmission of the second PUSCH,
    wherein each of the first PUSCH and the second PUSCH is a data channel, and
    wherein, based on the transmission of the first PUSCH that would include a report of semi-persistent channel state information (CSI) overlapping in time with the transmission of the second PUSCH that would include an uplink shared channel, the UE does not transmit the first PUSCH and transmits the second PUSCH.

2. The method of claim 1, wherein the DCI comprises information related to an activation for transmitting of the report of the semi-persistent CSI on the first PUSCH.

3. The method of claim 1, wherein the UE receives a CSI report configuration from the base station via the RRC layer,
    wherein the CSI report configuration includes a parameter for the report of the semi-persistent CSI.

4. The method of claim 1, wherein the semi-persistent CSI is reported with a predetermined periodicity during a predetermined time period.

5. A User Equipment (UE) configured to transmit a first physical uplink shared channel (PUSCH) or a second PUSCH, the UE comprising:
    a transceiver configured to transmit and receive a radio signal; and
    a processor connected to the transceiver,
    wherein the processor is configured to:
        control the transceiver to receive, from a base station, downlink control information (DCI) via a physical layer,
        wherein the physical layer is different from a radio resource control (RRC) layer; and
        control the transceiver to transmit, to the base station and after receiving the DCI, one of the first PUSCH or the second PUSCH based on whether a transmission of the first PUSCH would overlap in time with a transmission of the second PUSCH,
        wherein each of the first PUSCH and the second PUSCH is a data channel, and
        wherein, based on the transmission of the first PUSCH that would include a report of semi-persistent channel state information (CSI) overlapping in the time with the transmission of the second PUSCH that would include an uplink shared channel, the UE does not transmit the first PUSCH and transmits the second PUSCH.

6. The UE of claim 5, wherein the DCI comprises information related to an activation for transmitting of the report of the semi-persistent CSI on the first PUSCH.

7. The UE of claim 5, wherein the UE is further configured to receive a CSI report configuration from the base station via the RRC layer,
    wherein the CSI report configuration includes a parameter for the report of the semi-persistent CSI.

8. The UE of claim 5, wherein the semi-persistent CSI is reported with a predetermined periodicity during a predetermined time period.

* * * * *